/

US008984811B2

(12) United States Patent
Fairchild

(10) Patent No.: US 8,984,811 B2
(45) Date of Patent: Mar. 24, 2015

(54) DOOR APPARATUS AND METHOD

(75) Inventor: Sean J. Fairchild, Edmonds, WA (US)

(73) Assignee: Greenpoint Technologies, Inc., Kirkland, WA (US)

( * ) Notice: Subject to any disclaimer, the term of this patent is extended or adjusted under 35 U.S.C. 154(b) by 382 days.

(21) Appl. No.: 13/167,221

(22) Filed: Jun. 23, 2011

(65) Prior Publication Data

US 2011/0315822 A1  Dec. 29, 2011

Related U.S. Application Data

(60) Provisional application No. 61/357,903, filed on Jun. 23, 2010.

(51) Int. Cl.

| E05F 15/00 | (2006.01) |
|---|---|
| B60J 5/06 | (2006.01) |
| B64C 1/14 | (2006.01) |
| B66B 13/08 | (2006.01) |
| E05F 15/12 | (2006.01) |
| E05F 15/14 | (2006.01) |
| E05F 17/00 | (2006.01) |
| B64C 1/00 | (2006.01) |

(52) U.S. Cl.
CPC .............. *B60J 5/062* (2013.01); *B64C 1/1415* (2013.01); *B64C 1/1438* (2013.01); *B66B 13/08* (2013.01); *E05F 15/127* (2013.01); *E05F 15/147* (2013.01); *E05F 15/148* (2013.01); *E05F 17/004* (2013.01); *B64C 2001/0027* (2013.01); *E05Y 2900/502* (2013.01)
USPC ................................. 49/280; 49/279; 49/209

(58) Field of Classification Search
USPC ........... 49/279–281, 300, 209–211, 213–216, 49/218–220, 225; 244/129.4, 129.5
See application file for complete search history.

(56) References Cited

U.S. PATENT DOCUMENTS

| 2,008,893 | A |   | 7/1935 | Bancroft |  |
|---|---|---|---|---|---|
| 3,011,779 | A |   | 12/1961 | Reiter |  |
| 3,051,280 | A | * | 8/1962 | Wood et al. | 49/249 |
| 3,383,798 | A | * | 5/1968 | Day | 49/219 |
| 3,802,125 | A | * | 4/1974 | Baker | 49/360 |
| 4,180,943 | A | * | 1/1980 | Smith et al. | 49/279 |
| 4,884,831 | A |   | 12/1989 | Emon |  |
| 5,031,863 | A | * | 7/1991 | Noble | 244/129.5 |

(Continued)

FOREIGN PATENT DOCUMENTS

| FR | 2254477 A1 | 7/1975 |
|---|---|---|
| GB | 1452334 | 10/1976 |

*Primary Examiner* — Katherine Mitchell
*Assistant Examiner* — Scott Denion
(74) *Attorney, Agent, or Firm* — Seed IP Law Group PLLC

(57) ABSTRACT

A door apparatus includes a door, actuating mechanism, and tie rod mechanism, the actuating mechanism actuating the tie rod mechanism to impart a substantially translating motion to the door. The actuating mechanism can include a drive yoke coupled to the tie rod mechanism with a one-way coupling. The tie rod mechanism can include a primary tie rod coupled to a secondary tie rod coupled to a latch. In another aspect a door apparatus includes an actuator, a first door, a second door, a first linkage assembly coupling the actuator to the first door, and a second linkage assembly coupling the first door to the second door, the actuator configured to activate the first linkage assembly to move the first door, the first door imparting motion to the second linkage assembly to move the second door in a synchronous and opposite motion with respect to the motion of the first door.

7 Claims, 16 Drawing Sheets

(56) References Cited

U.S. PATENT DOCUMENTS

| | | | |
|---|---|---|---|
| 5,064,147 A | * | 11/1991 | Noble et al. ............... 244/129.5 |
| 5,077,938 A | * | 1/1992 | Moreuil ......................... 49/362 |
| 5,156,359 A | * | 10/1992 | Noble et al. ............... 244/129.4 |
| 5,163,639 A | * | 11/1992 | Herrmann et al. ......... 244/129.5 |
| 5,636,814 A | * | 6/1997 | Rollert ....................... 244/129.5 |
| 7,861,462 B2 | * | 1/2011 | Smith et al. ..................... 49/360 |
| 2010/0059628 A1 | * | 3/2010 | Kobayashi et al. ........ 244/129.5 |
| 2011/0084172 A1 | * | 4/2011 | Fairchild .................... 244/137.1 |

* cited by examiner

DOOR APPARATUS AND METHOD

BACKGROUND

1. Technical Field

The present disclosure generally relates to door systems and apparatuses, and more particularly, to door apparatuses with a space efficient range of motion, for example, relating to aircraft ingress/egress and/or carriage ingress/egress such as passenger elevators and/or object carriages.

2. Description of the Related Art

Designers increasingly aim for resilient, efficient, lightweight, and easy to operate dynamic or movable structures, such as doors. This is particularly the case in aircraft applications having strict strength, operations, size, shape and weight requirements.

Aircraft doors include primary structure doors, for example passenger entry/exit and cargo doors, and secondary structure doors, for example interior furnishing doors. Primary structure doors typically form a fuselage portion, retaining pressure during flight.

Multipurpose aircraft and growing aircraft loading and unloading demands can benefit from light ingress/egress assemblies, easy to operate with sufficient structural qualities and capabilities. Conventional door designs are generally heavy and difficult to operate with space-consuming range of motion, unsuited for installation in some fuselage locations.

A common door design includes hinged doors pivoting away from the fuselage to open. These doors require excess space in order to swing between open and closed positions. In addition, operating these doors is typically cumbersome, often requiring multiple steps and operations to switch between open and closed positions. Some doors require turning a lever with a minimum threshold force to unseal the door, followed by one or more inward, outward and/or lateral movements before pivoting or moving to the open position.

These door installations are limited to locations with sufficient space to accommodate their operation. Furthermore, they tend to be slow and difficult to operate. Their range of motion limits or prevents manual operation because these doors are heavy, making them difficult to manually operate in fuselage locations where gravity acts on the door, such as fuselage lower lobe.

Other doors exhibit lesser pivoting motion with respect to the fuselage. These designs, however, typically have complicated and heavy mechanisms, with actuating components coupling the door to the fuselage at more than one side of the door. Furthermore, operating these doors requires multiple operations similar to the hinged doors discussed above.

Furthermore, operators, particularly heads of state, private, and VIP aircraft operators can benefit from loading and unloading accessories that reduce or eliminate dependence on external loading and unloading devices, and terminals, particularly due to growing security concerns and privacy preferences of such parties. However, proposed integrated passenger elevator solutions have generally not materialized due to, among other things, lacking space-efficient and lightweight fuselage and elevator carriage doors.

BRIEF SUMMARY

In one embodiment, a door assembly for an aircraft fuselage incorporates a door, a latch, a linkage and an actuator. The door is adapted to mate with an opening in the fuselage. The door is movably mounted on guides to be movable between a closed configuration, in which the door occludes the opening, and an open configuration, in which the door is longitudinally displaced in a first direction to reveal at least a portion of the opening. The door in the open configuration generally is in the same angular orientation as the door in the closed configuration. The latch is movably coupled to the door to be moved between a deployed state and a retracted state. The latch is adapted to selectively fix the door in the closed configuration by moving into the deployed state when the door is in the closed configuration, and to selectively allow the door to move out of the closed configuration by moving into the retracted state when the door is in the closed configuration. The linkage is controllably coupled to the latch, and is movable between a first position, in which the latch is in the retracted state, and a second position, in which the latch is in the deployed state. At least a portion of the linkage, when in the first orientation, is longitudinally spaced in the first direction from the portion of the linkage when it is in the second position. The actuating mechanism is coupled between the portion of the linkage and the fuselage. The actuating mechanism is movable in the first direction with respect to the fuselage to first move the portion of the linkage from the second configuration into the first configuration and, with it, move the latch into the retracted state, and to continue moving in the first direction to move the door from the closed configuration toward the open configuration, such that the actuating mechanism both unlocks the door and opens the door in a single, continuing movement.

In another embodiment, a door apparatus is configured to be coupled to a carriage having an opening. The door apparatus incorporates a main actuator, a master door having an inner end and an outer end, a slave door having an inner end and an outer end, a first linkage assembly coupling the actuator to the master door, and a second linkage assembly movably coupling the master door to the slave door. The actuator is configured to actuate the first linkage assembly and move the master door. Movement of the master door actuates the second linkage assembly to move the slave door in a substantially synchronous and opposite motion with respect to the motion of the master door.

DETAILED DESCRIPTION

For clarity and without intention to limit the scope of the present disclosure the disclosure herein, including FIGS. 1 through 16, describes certain embodiments with respect to particular applications such as ingress/egress with respect to an aircraft fuselage. It is understood, however, other door or ingress/egress applications may use other embodiments and/or these and other embodiments can be used on various applications not explicitly disclosed.

For clarity and without intention to limit the scope of the present disclosure, the term "inboard" is used in aircraft application to refer to a direction generally inward from outer aircraft fuselage boundaries toward a space bound by the fuselage, and the term "outboard" is used in aircraft application to refer to a direction generally outward from a space bound by the fuselage toward fuselage boundaries.

For clarity and without intention to limit the scope of the present disclosure, the term "forward" is used in aircraft application to refer to a direction generally toward a front, nose, or a cockpit of an aircraft, and the term "aft" is used in aircraft application to refer to a direction generally toward a tail or empennage of an aircraft.

Figure 1:
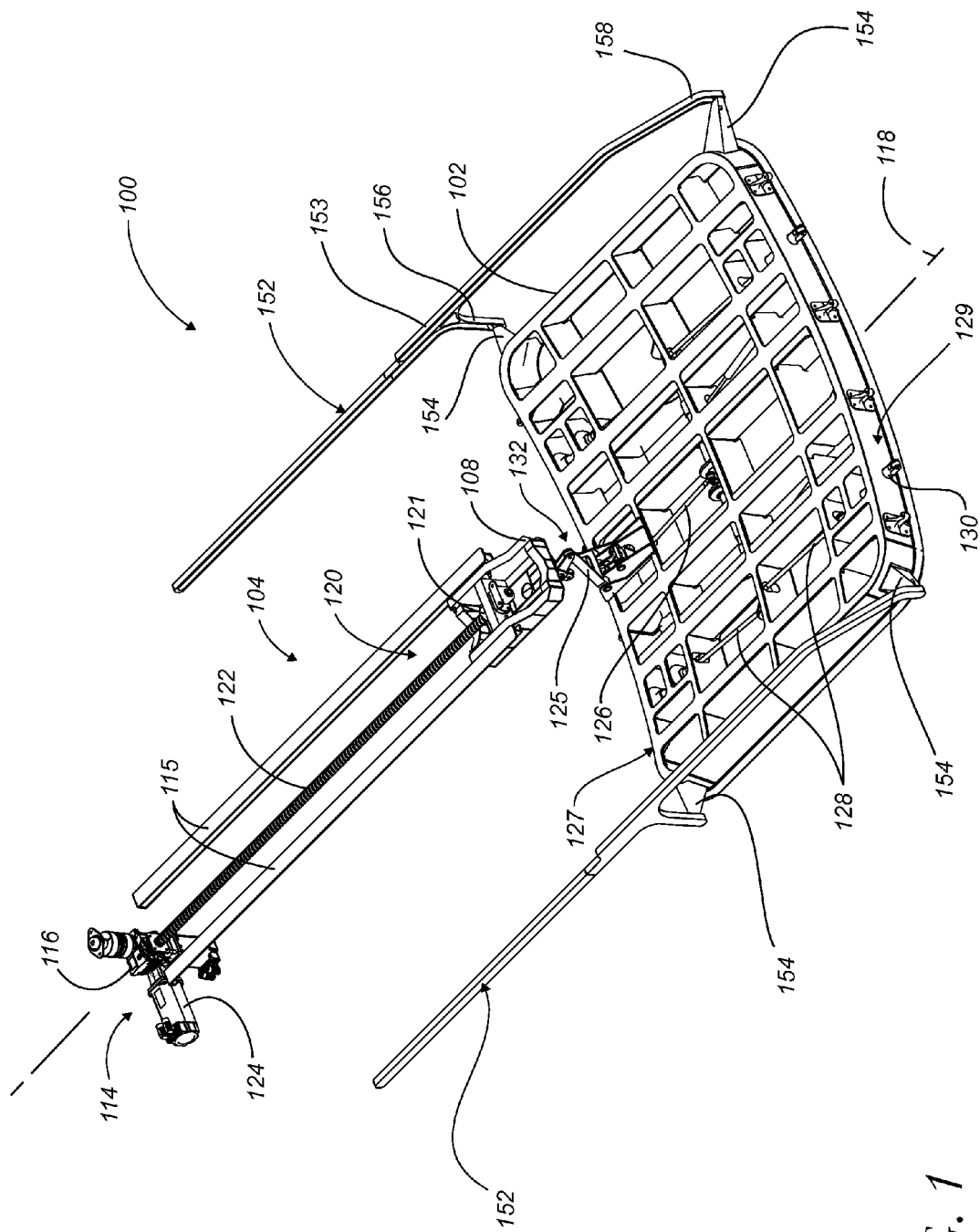
FIG. 1 is an isometric view of a door apparatus having a door according to one embodiment.

FIG. 1 illustrates a door apparatus 100 having a door 102 according to one embodiment adapted to move from a closed state to an open state in an open cycle, and from the open state to the close state in a closed cycle. In one embodiment, the door apparatus 100 includes an actuation mechanism 104 configured to move the door 102 with respect to a body such as an aircraft fuselage.

Figure 2:
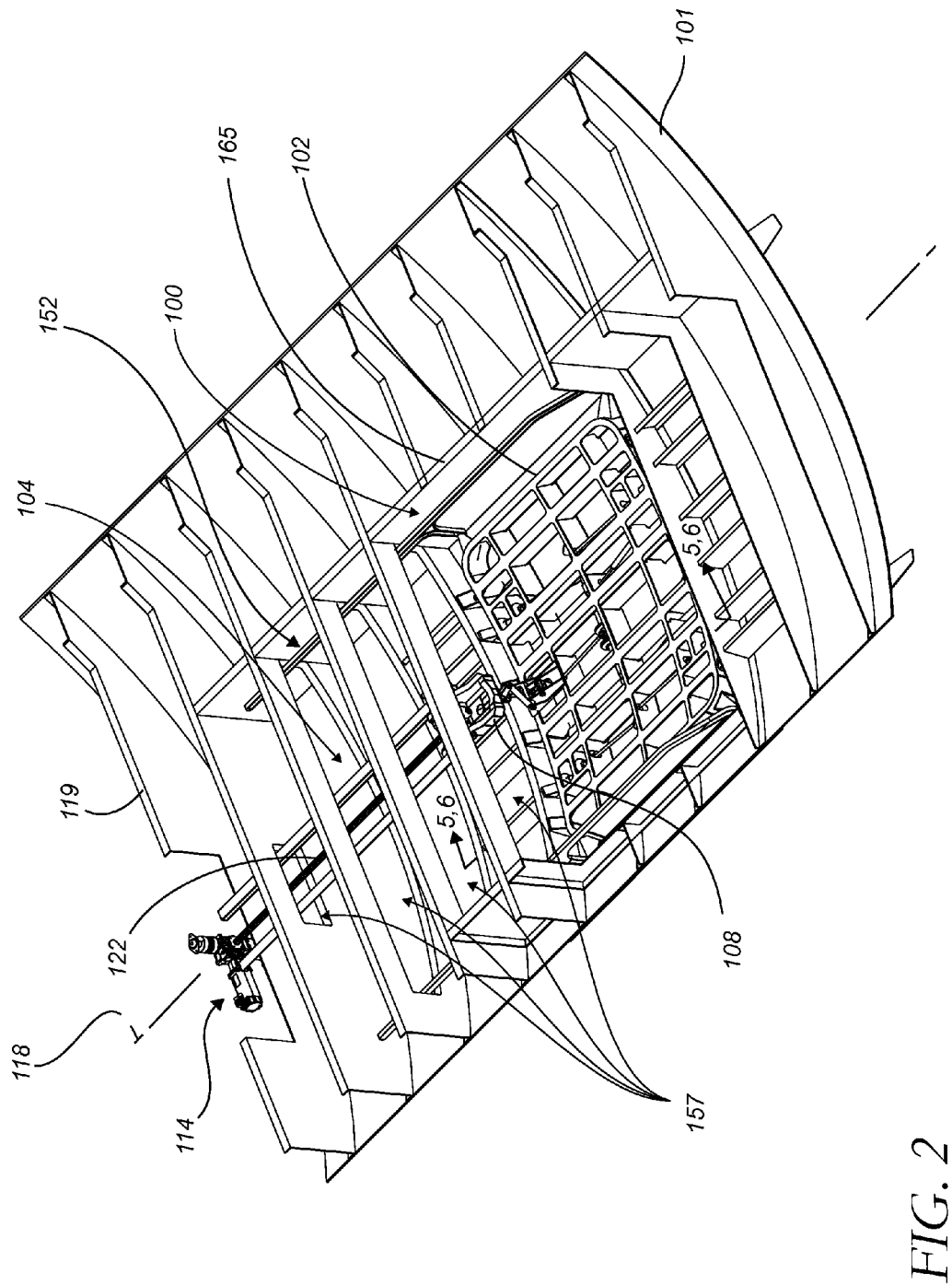
FIG. 2 is an isometric view of the door apparatus of FIG. 1 coupled to a portion of an aircraft fuselage with the door in a closed state according to one embodiment.
Figure 3:
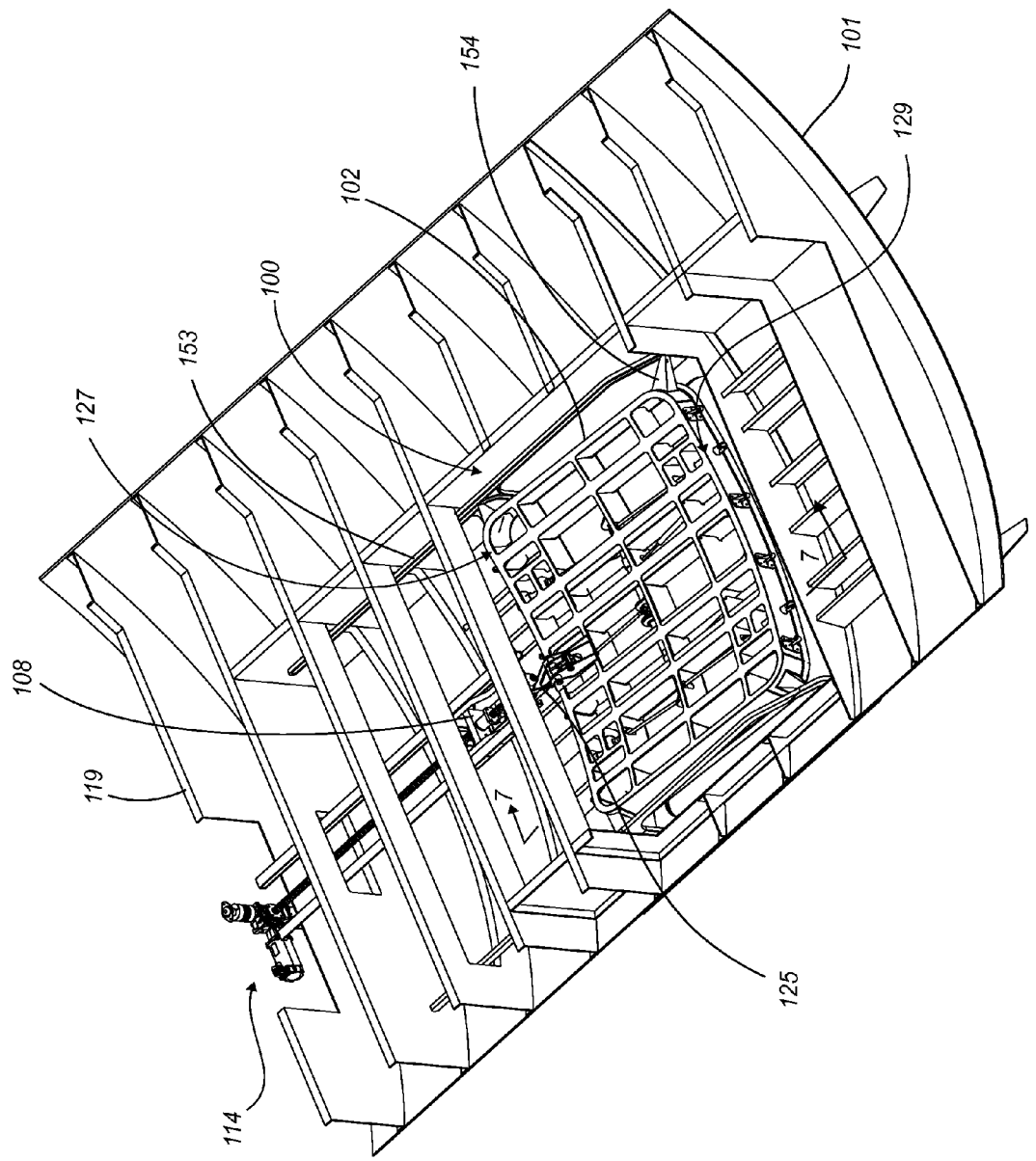
FIG. 3 is an isometric view of the door apparatus and fuselage of FIG. 2 with the door in an intermediate state according to one embodiment.
Figure 4:
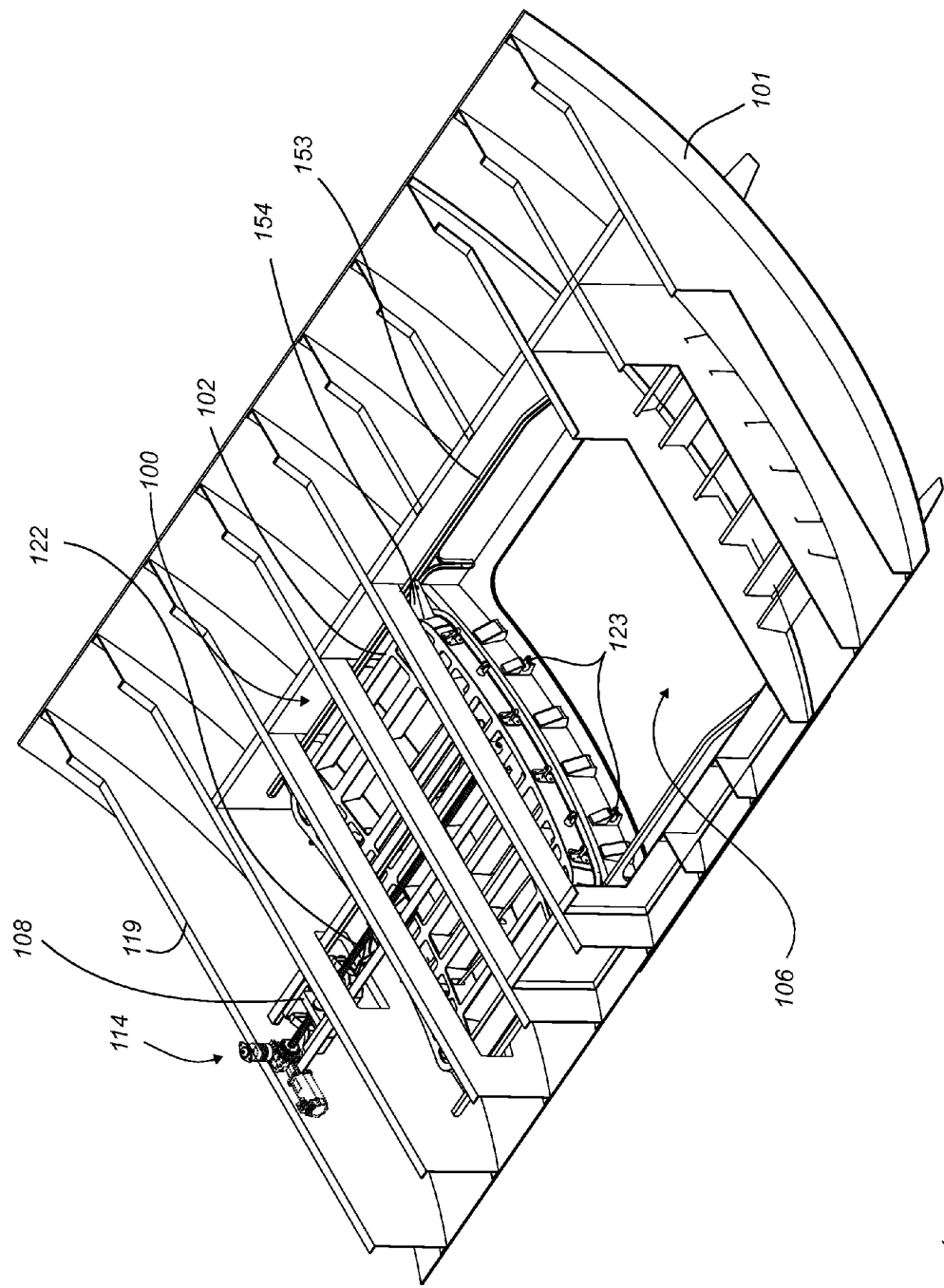
FIG. 4 is an isometric view of the door apparatus and fuselage of FIG. 2 with the door in an open state according to one embodiment.

FIGS. 2 through 4 illustrate one embodiment of the door apparatus 100 coupled to a portion of a fuselage 101 with the door 102 in closed, intermediate and open positions or states, respectively. In the closed state, the door 102 can be adapted to occlude, close, cover, and/or seal an ingress/egress opening 106 (FIG. 4) in the fuselage 101 and in the open position the door 102 can be adapted to reveal, expose, and/or provide access to the opening 106.

As illustrated in FIG. 1, in one embodiment, the actuation mechanism 104 can include at least one drive carriage 108. In one embodiment, the door apparatus 100 can include at least one drive apparatus 114 configured to move the drive carriage 108, for example via a transmission assembly 116 operatively coupled to the drive carriage 108. In one aspect, the drive apparatus 114 is operatively coupled to the drive carriage 108, and configured to selectively move the drive carriage 108 along an axis 118. In some embodiments, the axis 118 can be substantially parallel to a longitudinal or roll axis of the fuselage 101 (FIG. 2).

In the illustrated embodiment, the drive apparatus 114 is configured to move the drive carriage 108 via transmission assembly 116 and a ball screw mechanism 120. Other embodiments can include other devices such as rollers, cables, straps, wheels, and/or rails, any combination thereof, or other suitable movement devices.

In one aspect, the ball screw mechanism 120 includes a ball nut 121 threadedly and/or movably coupled with respect to a ball screw shaft 122. The ball nut 121 can be fixedly or removably coupled to the drive carriage 108. The ball screw mechanism 120 can be selectively operated via the drive apparatus 114 to move the door 102 between the open and closed states. In one aspect, the transmission assembly 116 can rotate the ball shaft 122, moving the ball nut 121 and the drive carriage 108 along the ball shaft 122.

In other embodiments, the ball nut can be rotatably coupled with respect to the drive carriage and a drive apparatus can be operatively coupled to the ball nut to rotate the ball nut with respect to the ball shaft. Yet other embodiments may include other motion devices such as conveyors, pulleys, driven rollers and/or sliders, any combination thereof, or any other suitable motion device.

In one aspect, the drive apparatus 114 includes a power-generating or drive member 124 such as a motor. The power-generating member 124 is referred to as motor 124 for clarity, without intention to limit scope of the present disclosure. Other suitable power-generating and/or drive devices are contemplated and within scope of the present disclosure.

In one embodiment, the motor 124 can be operatively, electronically, and/or mechanically coupled to the transmission assembly 116, and the drive apparatus 114 can be mounted in a desired location. For example, as illustrated in FIG. 4, in an aircraft ingress/egress application, the drive apparatus 114 can be coupled to at least one fuselage structural element such as skin, frame, stringer, intercostal, floor structure, any combination thereof, and/or any other suitable structure or element able to support the motor. In the illustrated embodiment, the drive apparatus 114 is coupled to the frame 119 positioned toward a distal end of the ball shaft 122, with respect to the opening 106. In FIGS. 2 and 3, the bulkhead frame 119 is partially cut away for clarity, to expose the drive apparatus 114.

In other embodiments, structure can be added to fuselage structure for mounting the drive apparatus 114 or any other portion of the door apparatus 100.

The drive carriage 108 can be operatively coupled to the transmission assembly 116 to move along a desired travel path and move the door 102 between closed and open states. For example, in the illustrated embodiment in FIGS. 2 through 4, the drive carriage 108 is configured to move the door 102 along a path adjacent or proximate the fuselage 101 without requiring the door 102 to pivot outside the fuselage 101 and without pivoting along substantially the entire range of motion between closed and open states. Therefore, an aircraft door according to an embodiment can translate between closed and open positions in a space-conserving and easy to operate manner.

In one embodiment illustrated in FIG. 1, the door apparatus 100 can include at least one carriage guiderail 115. In the illustrated embodiment, the door apparatus 100 includes two carriage guiderails 115, extending substantially parallel to the axis 118 and positioned on opposing sides of the ball screw shaft 122. In one aspect, the drive carriage 108 is configured to be three dimensional, substantially laterally centered about the ball screw shaft 122, and slidably, rollably, or otherwise movably coupled to the carriage guiderails 115.

In one embodiment, the actuating mechanism 104 includes a drive yoke 125 and a latching mechanism including at least one primary tie rod 126, at least one secondary tie rod 128, and a plurality of latch elements 130. In one aspect, the latch elements 130 are adapted to move between a deployed state in which they extend toward and/or beyond a corresponding edge of the door 102, and a retracted state in which they retract from the deployed state toward the door 102. In one embodiment, the drive carriage 108 is pivotably and/or rotatably coupled to the drive yoke 125, for example toward a first end 132 of the drive yoke 125.

As illustrated in FIGS. 2 and 4, respectively, when the door 102 is in the closed position the drive carriage 108 is in a first position and when the door 102 is in the open position the drive carriage 108 is in a second position. For example, in an embodiment in which the door 102 moves forward with respect to the fuselage 101 longitudinal axis to open, the second position of the drive carriage 108 is forward the first position thereof.

For clarity, the drive carriage 108 first and second positions are respectively referred to as aft and forward positions. In different embodiments, however, a door apparatus according to an embodiment can be designed to move the door in any desired direction with respect to the fuselage.

Figure 5:
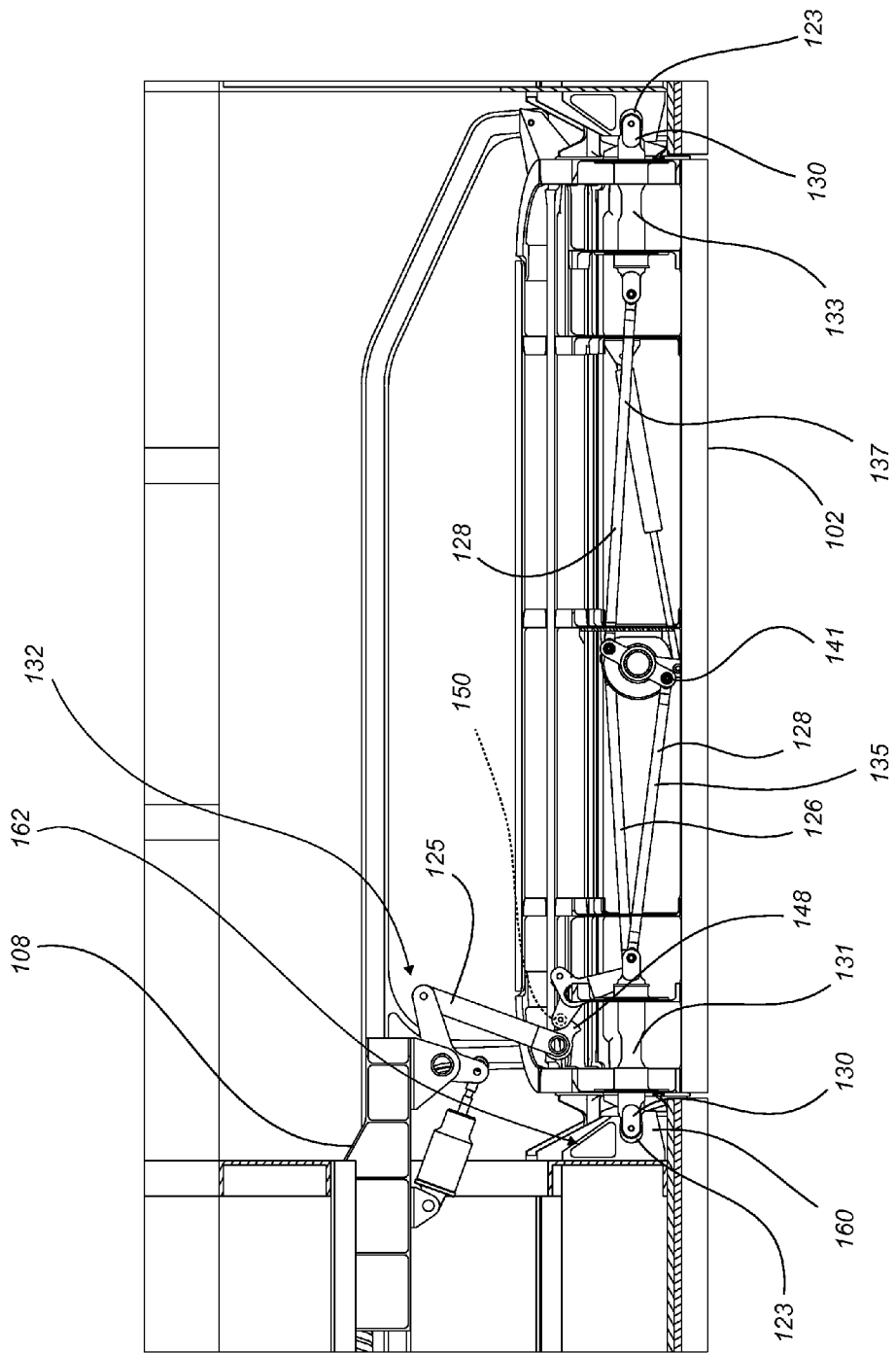
FIG. 5 is a cross-sectional view of the door apparatus and fuselage of FIG. 2, viewed across Section 5-5 of FIG. 2 with latches in an engaged state according to one embodiment.

In one embodiment, illustrated in FIG. 5, when the door 102 is in the closed position, each latch element 130 is in an engaged state in which it is configured to be coupled to a complementary engagement feature 123 in, on, adjacent to, coupled to, or in the vicinity of, the opening 106 (FIG. 7), for example in the region of the opening 106 surround structure. The complementary engagement features 123 are also illustrated in FIG. 4 according to one aspect.

Figure 6:
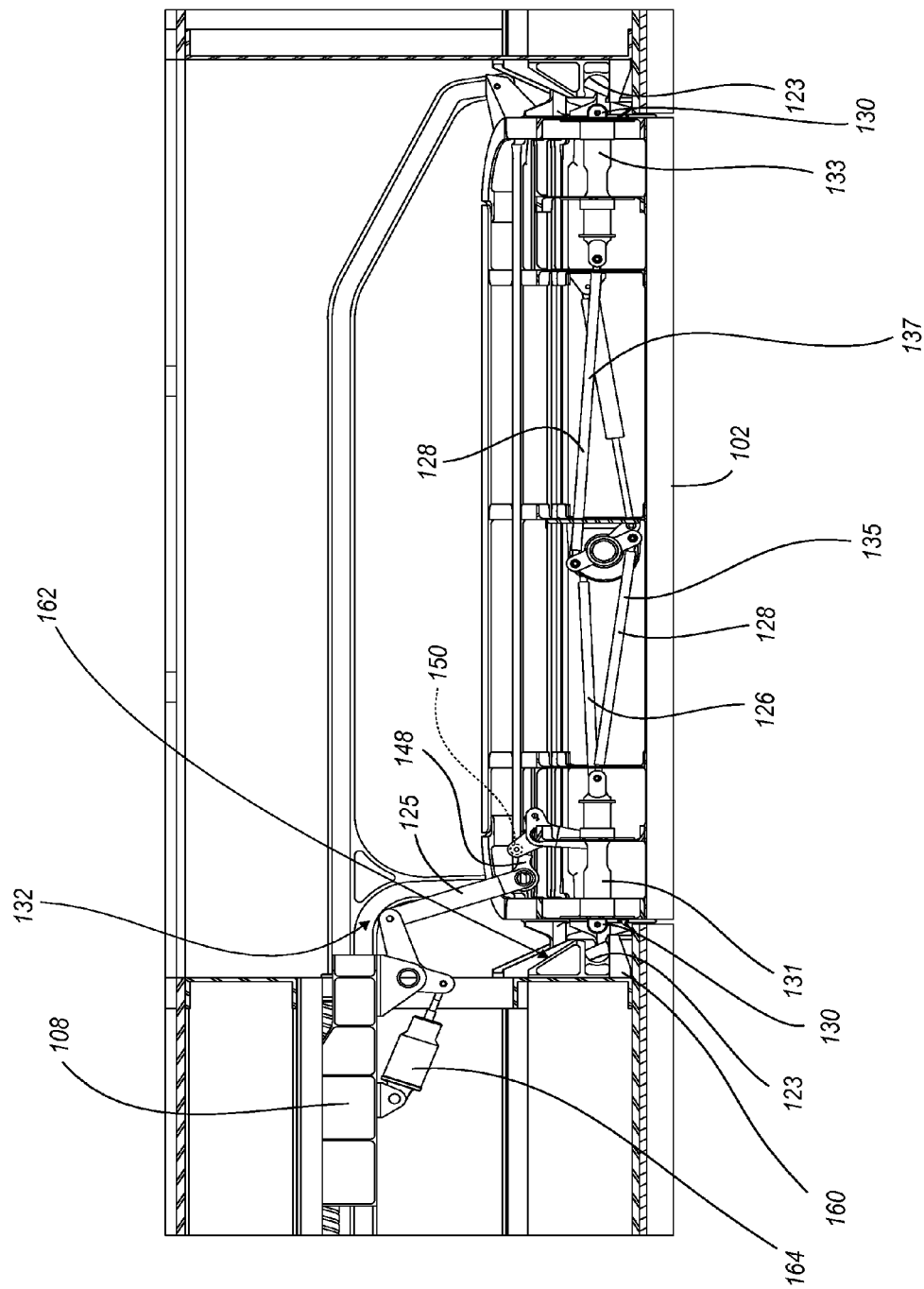
FIG. 6 is the cross-sectional view of the door apparatus and fuselage of FIG. 2, viewed across Section 6-6 of FIG. 2, with latches in a disengaged state according to one embodiment.
Figure 7:
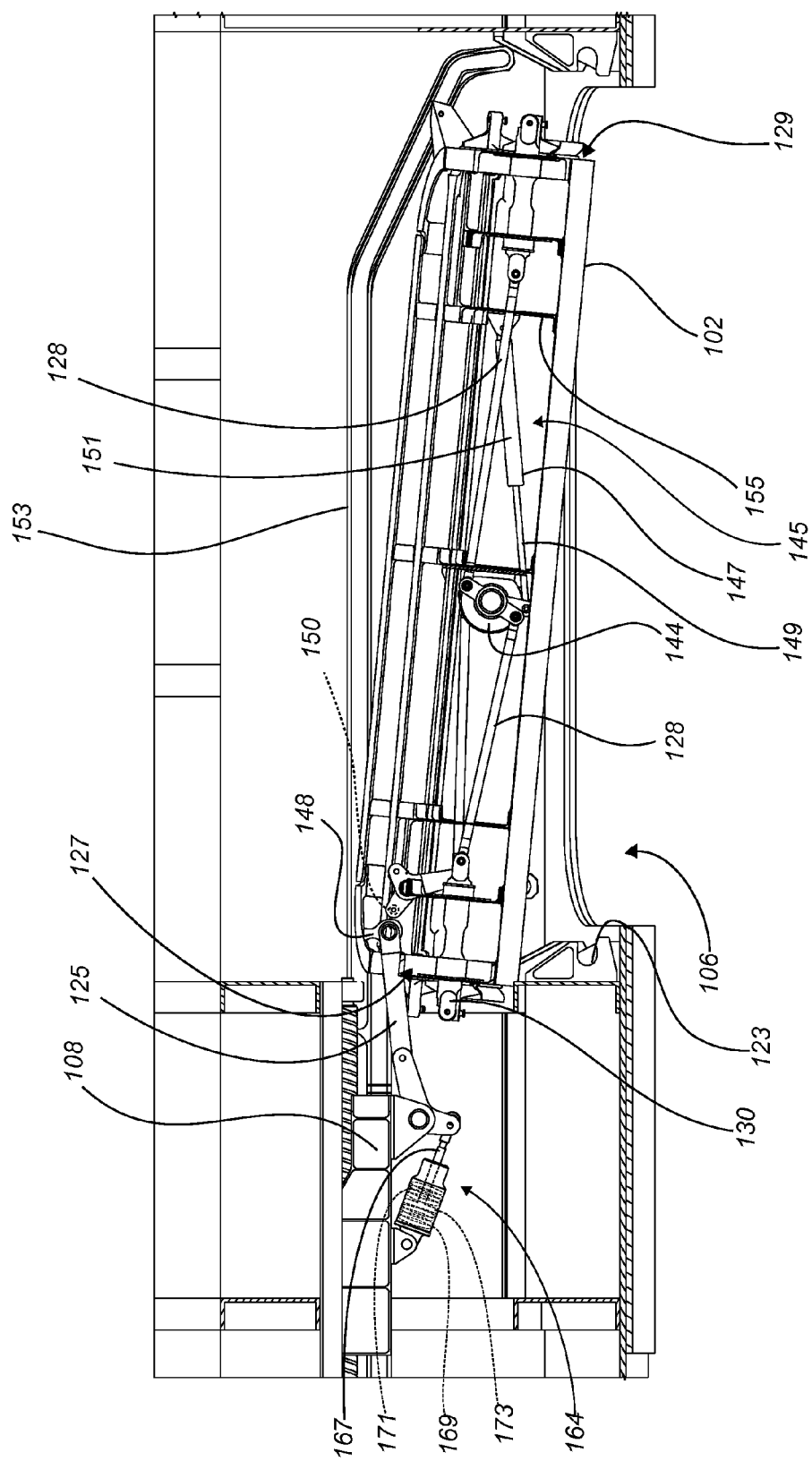
FIG. 7 is a cross-sectional view of the door apparatus and fuselage of FIG. 2, viewed across Section 7-7 of FIG. 3 according to one embodiment.

As illustrated in FIG. 6, in one embodiment, the drive carriage 108 and at least a portion of the drive yoke 125 move forward in a first phase motion to unlatch the door 102. As illustrated in FIGS. 3, 4, and 7, in one embodiment, the drive carriage 108 and drive yoke 125 move further forward in a second phase motion to lift and translate the door 102 away from opening 106.

In one aspect, during the first phase the drive yoke 125 can pivot from its position illustrated in FIG. 5 to its position in FIG. 6 to disengage the latch elements 130 and move the door 102 as described with respect to one embodiment below.

In one aspect as illustrated in FIG. 1, the door 102 includes a forward end 127 and an aft end 129. In one aspect, the drive yoke 125 is rotatably coupled with respect to the door 102 toward the forward end 127 of the door 102.

Referring to FIGS. 5 and 6, in one aspect, as the drive carriage 108 moves in the first phase, it exerts a force such as a pulling force toward the first end 132 of the drive yoke 125, actuating the drive yoke 125 with respect to the door 102. In one embodiment, forward motion of the drive carriage 108 moves the first end 132 of the drive yoke 125 forward, pivoting the drive yoke 125, which in turn moves the primary tie rod 126 forward and the secondary tie rods 128 away from door 102 surround structure to disengage the latch elements 130 from the corresponding engagement features 123.

Figure 8:
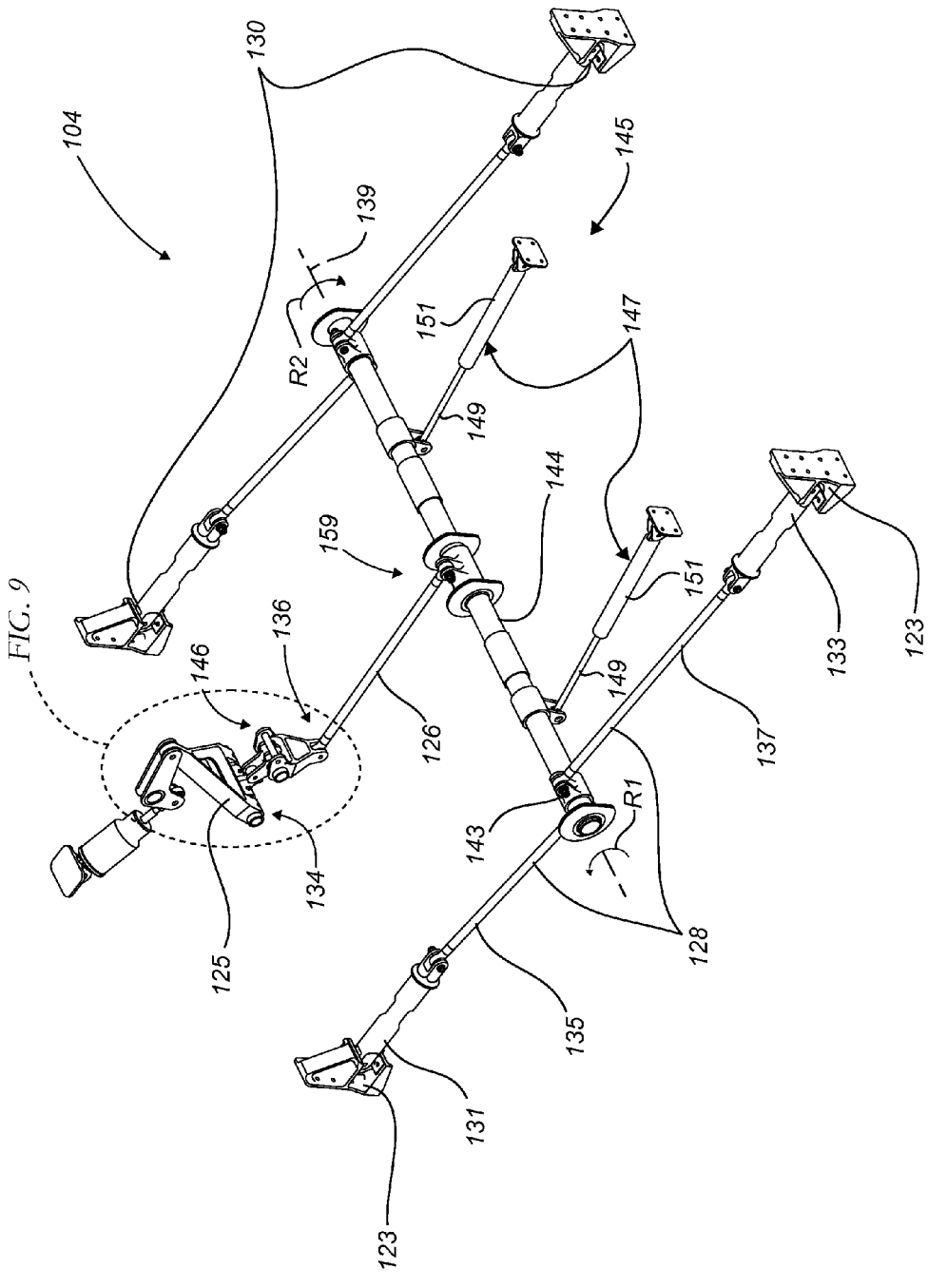
FIG. 8 is an isometric view of a portion of an actuating mechanism of the door apparatus of FIG. 1 according to one embodiment.

FIG. 8 illustrates one embodiment of a portion of the actuating mechanism 104 with other portions thereof, the door 102, and fuselage 101 removed for clarity. As illustrated in FIG. 8, according to one embodiment the drive yoke 125 is pivotably or rotatably coupled with respect to the primary tie rod 126, for example toward a second end 134 of the drive yoke 125 and a first end 136 of the primary tie rod 126.

In one aspect, the drive yoke 125 can be rotatably coupled with respect to the door 102 to pivot and disengage the latch elements 130, and translate forward while lifting and moving the door 102 toward the open position. For example, in one embodiment, the door apparatus 100 can include a lost motion mechanism 146 to facilitate a desired rotational movement between the drive yoke 125 and the door 102. In one aspect, the drive yoke 125 can be coupled to the primary tie rod 126 via the lost motion mechanism 146 or a portion thereof.

Figure 9:
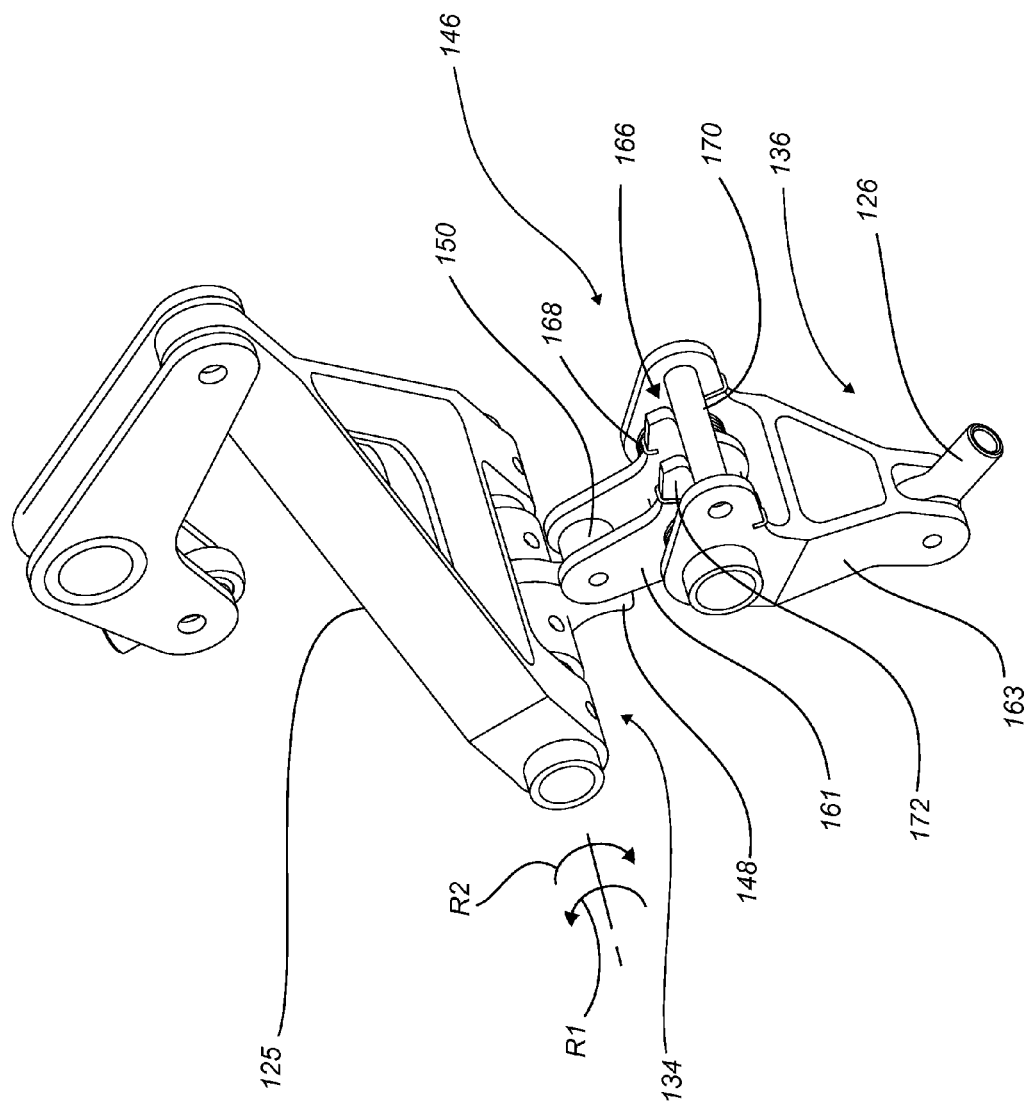
FIG. 9 is a close-up isometric view of a portion of the actuating mechanism of FIG. 8 according to one embodiment.

For example, as more clearly illustrated in FIG. 9, the lost motion mechanism 146 may include a first cam structure such as a cam member 148 engaged to, in contact with, or coupled to a second cam structure such as a cam follower 150. In one aspect, the cam member 148 can be coupled toward the second end 134 of the drive yoke 125, and the cam follower 150 can be coupled toward the first end 136 of the primary tie rod 126. For example, in one aspect, the cam follower 150 can be rotatably coupled with respect to the primary tie rod 126.

In one embodiment, the cam member 148 and cam follower 150 can be configured to convert rotational or pivotal movement of the drive yoke 125 to a generally forward movement of the primary tie rod 126. This movement can disengage the latch elements 130 during the first phase motion of the drive carriage 108 as described below with respect to one embodiment. Other suitable relative movements or intermediate structures or features between the primary tie rod 126 and latch elements 130 are contemplated and within the scope of the present disclosure.

In one embodiment as illustrated in FIGS. 5, 6, and 8, the latch elements 130 include forward latch element 131 and aft latch element 133. Moreover, the secondary tie rods 128 can include forward secondary tie rod 135 coupled to, or integrated with, the forward latch element 131, and aft secondary tie rod 137 coupled to, or integrated with, the aft latch element 133. In one aspect, the primary tie rod 126 can be coupled to the secondary tie rods 128 in any suitable manner to move the secondary tie rods 128 away from door ends and disengage the latch elements 130, or otherwise cause the secondary tie rods 128 to disengage the latch elements 130 from corresponding complementary engagement features 123.

For example, in the illustrated embodiment illustrated in FIG. 8, the actuation mechanism 104 includes a bell crank mechanism 144, coupling the primary tie rod 126 to the secondary tie rods 128. The bell crank mechanism 144 can be configured to transfer forward motion of the primary tie rod 126 to aft motion of the forward latch element 131 and forward motion of the aft latch element 133. In one aspect, the forward secondary tie rod 135 is pivotably coupled to the bell crank mechanism 144 at a first pivot point 141 (FIG. 5), and the aft secondary tie rod 137 is pivotably coupled to the bell crank mechanism 144 at a second pivot point 143. In one embodiment, the bell crank mechanism 144 is configured and/or mounted to rotate about a point or axis 139, which can in one aspect be positioned between first and second pivot points or axes 141, 143, respectively. In one aspect, the bell crank mechanism 144 is rotatably coupled to a portion of the door 102.

In one aspect, the primary tie rod 126 includes a second end 159. In one aspect, the primary tie rod 126 can be rotatably or pivotably coupled to the bell crank mechanism 144 toward the second end 159 of the primary tie rod 126.

In one embodiment, during the first phase motion, a portion of the drive yoke 125, such as an upper portion thereof, moves forward, rotating the drive yoke 125 in a first radial direction R1. Referring to FIG. 9, rotation of the drive yoke 125 rotates the cam member 148, thereby shifting or raising the cam follower 150. In one embodiment, the cam follower 150 can be coupled to the primary tie rod 126 to move the primary tie rod 126 generally forward when the cam follower 150 is shifted.

For example, in one aspect, the cam follower 150 can be coupled to the primary tie rod 126 via a first bell crank lever or member 161, rotatably coupled between the cam follower 150 and primary tie rod 126. In one embodiment, the cam follower 150 can be rotatably mounted or coupled to the first bell crank lever 161. In one embodiment, the lost motion mechanism 146 can include a second bell crank lever or member 163 pivotably or rotatably coupled between the first bell crank lever 161 and the primary tie rod 126 and configured to transfer rotation motion of the first bell crank lever 161 to a forward motion of the primary tie rod 126. For example in one aspect the second bell crank lever 163 can be pivotably coupled to the first bell crank lever 161 and pivotably coupled to the primary tie rod 126.

Although use of two bell crank levers are discussed with respect to the illustrated embodiment, it is contemplated that in other embodiments more or less motion conversion devices can be used in other embodiments to move the primary tie rod and disengage the latch elements.

Referring to FIG. 8, in one embodiment, during the first phase motion, the drive yoke 125 rotates in a first radial direction R1, to arrive at the position illustrated in FIG. 6 in which the latch elements 130 are disengaged from the corresponding complementary engagement features 123.

As illustrated in FIGS. 4 and 7, in one embodiment, during the second phase motion, the drive carriage 108 moves the drive yoke 125 forward. As the drive yoke 125 moves forward it carries the door 102, guiding it along its open cycle path as described with respect to one embodiment below. Other suitable manners of guiding the door along its motion in the open and/or close cycle are contemplated and within the scope of the present disclosure.

In one embodiment illustrated in FIG. 1, the door apparatus 100 includes at least one door guiderail 152. In the illustrated embodiment, the door apparatus 100 includes two door guiderails 152, each configured to be coupled to a corresponding support structure 165 as illustrated in FIG. 2. In one aspect illustrated in FIG. 1, the door guiderails 152 are spaced to accommodate receiving rollers or other guide elements 154 toward at least two opposing ends of the door 102, stabilizing and guiding the door along a desired path. The support structure 165 can in some embodiments include fuselage structure, added support structure, and/or any combination thereof.

In the illustrated embodiment, the drive yoke 125 can exert a forward force on the door 102, the door guiderails 152 guiding the door to lift and move the door 102 forward. In the illustrated embodiment, the door 102 translates inboard of the fuselage 101, reducing the space needed for door operation as compared to conventional aircraft doors and reducing chances of damage to the door 102, for example from impact with objects outside the fuselage 101.

In the illustrated embodiment of FIG. 1, the door guiderails 152 are spaced inboard from the fuselage 101, each door guiderail 152 having a primary rail 153, and forward and aft branch rails 156, 158 extending toward respective corners of the door 102 when in the door 102 is in the closed state.

In one aspect, when the door 102 is in the closed state, the guide elements 154 are configured to be movably coupled to, or positioned toward a lower or outboard end of the branch rails 156, 158, for example via rollers or sliders. The branch rails 156, 158 extend inboard to connect to, or communicate with, the primary rail 153. As the drive yoke 125 pulls the door 102 forward, the guide elements 154 travel inboard and move the door 102 inboard.

In some embodiments, the forward branch rails 156 extend inboard at a first slope and the aft branch rails 158 extend inward at a second slope less steep than the first slope. In some embodiments, the forward branch rails 156 and/or aft branch rails 158 can extend inboard substantially perpendicular to the corresponding primary rail 153.

In the illustrated embodiment, the forward branch rail 156 extends substantially perpendicular with respect to the primary rail 153, and the aft branch rail 158 extends at an angle with respect to the primary rail 153. This embodiment facilitates smooth transition of the door 102 with the drive yoke 125 coupled to the forward end 127 of the door 102.

As illustrated in FIGS. 3 and 7, in one embodiment, the drive yoke 125 being coupled toward the forward end 127 of the door 102 can lift the forward end 127 along a slope steeper than a slope along which the aft end 129 moves. In the illustrated embodiment, the forward end 127 of the door is lifted first, followed by the aft end 129 thereof.

In one embodiment illustrated in FIG. 4, when the guide elements 154 reach the primary rail 153, the drive carriage 108 moves the door 102 toward the open state.

Figure 10:
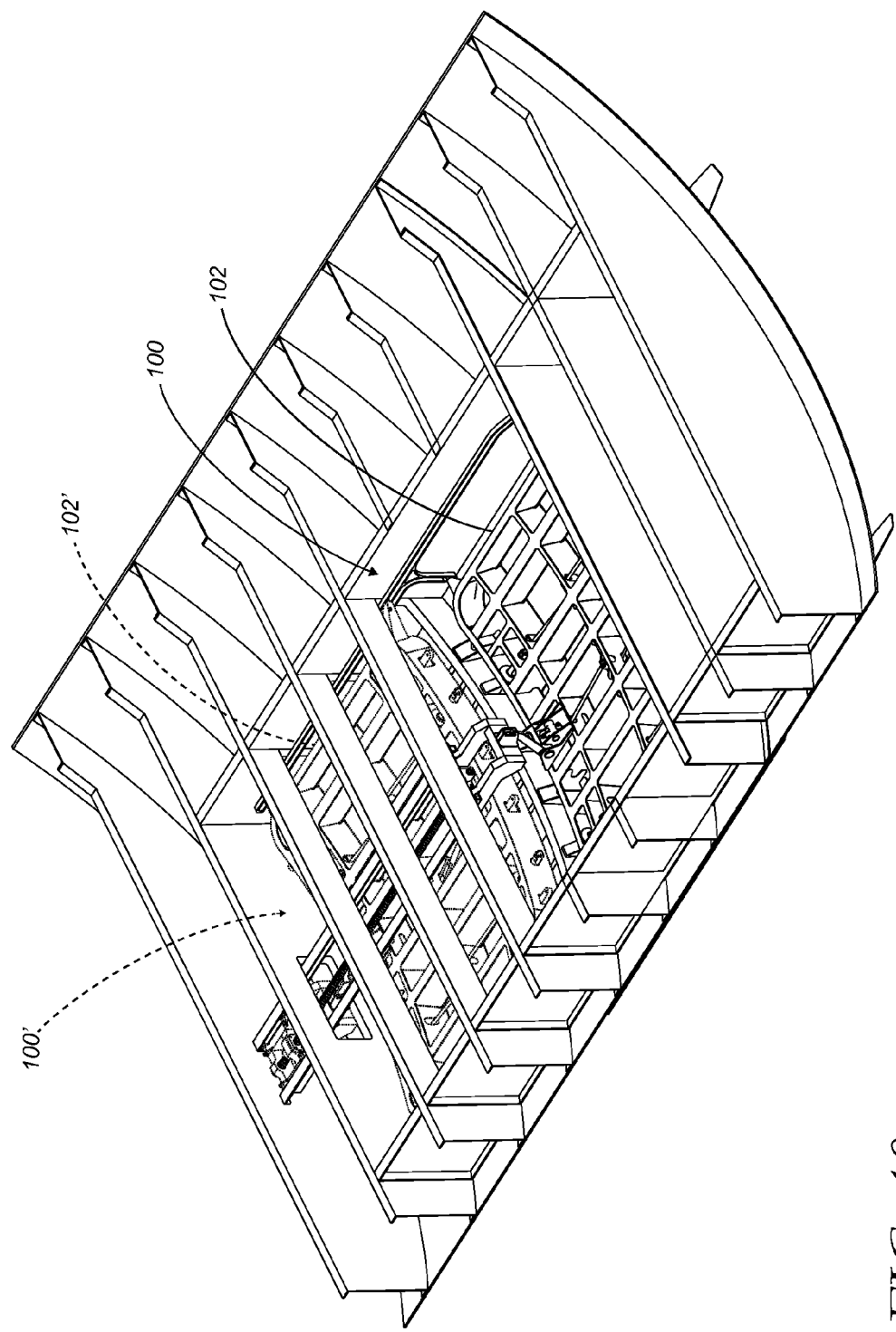
FIG. 10 is an isometric view of the door apparatus and fuselage of FIG. 2 illustrated in closed and open states, the door illustrated in phantom lines in the open state.

FIG. 10 illustrates an embodiment of the door apparatus 100, 100' with the door 102, 102' in closed and open positions, respectively, the door 102' being illustrated in phantom lines in the open position. As apparent from FIG. 10, an embodiment can be used to occlude and reveal a relatively large opening while consuming less space and fewer actuation mechanisms, and being easier to operate, as compared to conventional doors.

In some locations on aircraft fuselage there exists fuselage structure adjacent to ingress/egress openings such as the opening 106 illustrated in FIG. 4. For example, in some aircraft fuselage lower lobes there may exist series of frames or bulkheads. In one aspect as illustrated in FIG. 2, these frames can be modified to incorporate through openings 157 through which the door 102 and/or any portion of the actuation mechanism 104 or the ball screw mechanism 120 can travel and/or extend.

The modified structure can be reinforced to restore original or better strength. Embodiments with this feature exhibit a further reduced motion profile and allow other installations inboard the frames or bulkheads, such as provisions for securing cargo or mounting weight ballasts for weight and balance purposes. In yet other embodiments, a door apparatus can be designed to clear such frames or bulkheads, for example travel adjacent and/or above such structure.

The door 102 can be closed according to a reverse motion sequence of the above-described opening motion sequence.

In some embodiments, as illustrated in FIG. 8, the door apparatus 100 can include at least one biasing element 145 urging the latch elements 130 into the extended position. For example, in one aspect, the bell crank mechanism 144 can be biased to exert a force on the latch elements 130 to bias them outward with respect to the corresponding ends of the door 102. In the illustrated embodiment, the biasing element 145 includes a pressure arm 147 such as a pneumatic or hydraulic cylinder, or a cylinder with a biasing device therein.

The pressure arm 147 includes a plunger 149 movably coupled to a cylinder 151. In one aspect illustrated in FIG. 7, the pressure arm 147 is rotatably coupled to the bell crank 144 and a doorframe 155, toward opposing ends of the biasing element 145, respectively. A pressure medium or a biasing device in the cylinder 151 can bias the plunger 149 out of the cylinder, in turn, biasing the secondary tie rods 128 to retain the latch elements 130 in the deployed state, engaged to the engagement feature 123 when the door is in the closed state, and generally bias the latch elements 130 toward the deployed state. The latch elements 130 and complementary feature 123 can include a detent mechanism, a locking device, any combination thereof, or any other suitable engagement or coupling mechanism.

In one aspect, the cam member 148 can be sized to facilitate deploying the latch elements 130 toward the deployed state, following disengagement from the complementary engagement features 123. Referring to FIG. 9, in one embodiment, the cam member 148 includes a threshold size. In one aspect, the cam member 148 shifts the cam follower 150, moving the primary tie rod 126 forward against the biasing force of the pressure arms 147 and moving the plungers 149 into the corresponding cylinders 151 (FIG. 8). In one aspect, as the cam member 148 passes the cam follower 150, the plungers 149 are biased out from the cylinders 151, rotating the bell crank mechanism 144 in a second radial direction R2, substantially opposing the first radial direction R1 and deploying the latch elements 130 toward the deployed state.

In FIGS. 5 through 7, certain portions are removed to reveal one embodiment of the cam member 148 and cam follower 150. In FIG. 5 the cam member 148 and cam follower 150 are illustrated before the drive carriage 108 enters its first phase motion. In FIG. 6, the cam member 148 and cam follower 150 are illustrated during the drive carriage 108 and drive yoke 125 first phase motion, the cam member 148 shifting the cam follower 150 and disengaging the latch elements 130 as described above. As apparent from FIG. 7, after the first phase motion of the drive carriage 108, the cam member 148 clears the cam follower 150, allowing the latch elements 130 to deploy in response to biasing force from the biasing arm 147.

Referring to FIGS. 5 and 6, in one embodiment as the drive yoke 125 moves the door 102 from the open position toward the closed position, the latch elements 130 can be configured to position back into engagement with corresponding complementary engagement features 123.

For example in one aspect, the latch elements 130 can remain in the deployed state during the close cycle, and snap into engagement with corresponding engagement features 123. In one embodiment, the engagement features 123 can be formed or supported by respective latch engagement fittings 160. In one aspect, the latch engagement fittings 160 can include a tapered surface or ramp 162 generally facing inboard, on which the latch elements 130 can slide, be biased toward the retracted position and deploy to the extended position into the complementary engagement features 123 after clearing the tapered surface 162. In one aspect, gravity acting on the weight of the door 102 can assist in moving the door 102 to the closed position and engaging the latch elements 130 and complementary engagement features 123.

In one embodiment, the actuation mechanism 104 can include one or more mechanisms cooperating between the drive yoke 125 and primary tie rod 126 to facilitate converting drive yoke 125 motion to primary tie rod 126 motion in one direction to retract latch elements 130 temporarily to disengage them during the open cycle, and preventing such conversion in a second direction to maintain the latch elements 130 in the deployed state during the close cycle. In one aspect, such a mechanism can include a one-way rotational device or assembly as described below with respect to some embodiments and aspects.

Other suitable one-way arrangements including, but not limited to, one-way assemblies, clutches, bearings, and/or couplings, any combination thereof, or any other mechanism facilitating converting drive yoke 125 motion to primary tie rod 126 motion in one direction, and preventing the same in an opposing direction, are contemplated and within the scope of the present disclosure.

For example, in one aspect such a one-way mechanism can be incorporated between the cam member 148 and cam follower 150 to facilitate the cam member 148 and cam follower 150 resisting each other during the open cycle to transmit drive yoke 125 rotation to primary tie rod 126 motion, and disengage the latch elements 130. In one aspect such mechanism further may facilitate the cam member 148 and cam follower 150 yielding and not resisting each other during the close cycle to prevent drive yoke 125 rotation from being transmitted to the primary tie rod 126, and allow the latch elements 130 to remain in the deployed state. The following discussion relates to an embodiment in this regard, however, other embodiments may incorporate other suitable resisting and yielding combinations, which are contemplated to fall within the scope of the present disclosure.

In one embodiment illustrated in FIG. 9, the lost motion mechanism 146 can include a one-way mechanism 166 configured to allow the cam member 148 and cam follower 150 resist each other during the open cycle and yield with respect to one another during the close cycle.

For example, in one aspect, the one-way mechanism 166 can include a spring or other suitable biasing device 168 secured to the first bell crank lever 161 which supports the cam follower 150, and a first coupling feature or element 170 such as a lip, flange, protrusion, or other formation or feature formed on or coupled to the first bell crank lever 161. In one aspect, the one-way mechanism 166 can further include a second coupling feature or element 172, such as a cross bar or other feature or formation, configured to resist rotation of the first bell crank lever 161 in the second radial direction R2. In one aspect, the second coupling feature 172 can be coupled to, attached to, or formed on the second bell crank lever 163 positioned between the primary tie rod 126 and the first bell crank lever 161.

In one embodiment, the second coupling feature 172 contacts and resists against the first coupling feature 170 when the drive yoke 125 rotates the cam member 148 in the first radial direction R1 during the open cycle, the cam member 148 forcing the cam follower 150 and first and second bell crank levers 161, 163 to shift or rotate in the second radial direction R2.

In one embodiment, during the close cycle, the drive yoke 125 rotates the cam member 148 in the second radial direction R2, the spring 168 yielding to allow the first bell crank lever 161 rotate in the first radial direction R1 without transferring any motion to the primary tie-rod 126, thereby maintaining the latch elements 130 in the deployed position. In this and similar embodiments in which the latch elements 130 remain in the deployed position during the close cycle, the latch elements 130 will reposition into engagement with the complementary engagement features 123 as described above with respect to the latch engagement fittings 160.

In one aspect, following the cam member 148 clearing or passing the cam follower 150 during the close cycle, the spring 168 biases the first bell crank lever 161 back toward its pre-yielding position in which the first and second coupling features 170, 172 are proximate, adjacent, and/or contiguous with respect to each other, in preparation for the next open cycle. In one embodiment, the biasing force of the spring 168 is less than the biasing force of the biasing arm 147.

In addition, or instead, some embodiments may include other mechanisms or devices coupled to at least one of the first and second bell crank levers. For example, some embodiments may include a biasing or spring member coupled to or between the cam member and drive yoke, and the cam member can be rotatably coupled to the drive yoke, allowing the cam member or the structure coupling it to rotate during the close cycle and clear the cam follower to prevent latch retraction during the close cycle.

In addition, or instead, some embodiments may include other mechanisms coupled to at least one of the first and second bell crank levers and/or to at least one of the cam member and cam follower, allowing one-way resisting, such as one-way bearings, couplings, clutches, any combination thereof, and/or any other suitable one-way devices or mechanisms.

In still other embodiments, the primary tie rod may be directly coupled to the drive yoke with a one-way mechanism, bearing, or clutch converting drive yoke motion to primary tie rod motion in one direction to retract latch elements temporarily to disengage them during the open cycle, and preventing such conversion in a second direction to maintain the latch elements in the deployed state during the close cycle.

Embodiments facilitating deployed latches during the close cycle, inhibit or eliminate problems associated with specific retraction and deployment timing and do not depend on specific drive yoke positioning during close cycle.

Alternatively, in other embodiments, the cam member and cam follower can actuate the primary and secondary tie rods 126, 128, and cause the latch elements to retract and extend for the latch elements to clear structure forming the complementary engagement features, such as respective latch engagement fittings.

In some embodiments, the door apparatus 100 may include one or more devices or mechanisms moderating loads exerted on the actuating mechanism 104. For example, as illustrated in FIGS. 6 and 7, in one aspect the door apparatus 100 can include a dual biasing mechanism 164, such as a spring pack device or any other dual biasing mechanism. For brevity and clarity the dual biasing mechanism 164 is referred to as spring pack 164 without intention to limit the scope of the present disclosure.

In one embodiment illustrated in FIG. 7, the spring pack 164 includes a plunger 167, a first dampener 169 and a second dampener 171, the plunger 167 including a spring engagement feature 173. In one aspect, the spring engagement feature 173 is positioned between the first and second dampeners 169, 171. In one embodiment, the spring pack 164 can be rotatably coupled to the drive carriage 108 and drive yoke 125 toward opposing ends of the spring pack 164, moderating loads imposed on the drive carriage 108 and/or drive yoke 125 during door apparatus 100 operations, for example, via movement of the door 102 or weight of the door 102.

For example, in one aspect, the spring pack 164 and drive yoke 125 can be pivotably coupled to different legs of a bell crank rotatably coupled to the drive carriage 108 as illustrated in FIG. 7.

Therefore, a fuselage door apparatus according to an embodiment of the present disclosure reduces the connection regions between an actuating mechanism and a door, and unlatches and moves the door without requiring multiple actuations or actions. The door can be unlatched and moved to the open position, and latched and secured in the closed position by one operation for each. Furthermore, the door follows the motion of a drive carriage and or drive yoke in a space-conserving and efficient manner, allowing the door to translate with respect to the fuselage with a reduced motion profile. With these advantages, even larger doors can be utilized if desired for covering large openings without requiring additional space to open and close the door.

For example, in FIG. 10 the door apparatus 100, 100' is illustrated in both the closed and open states according to one embodiment. As apparent from FIG. 10, according to one embodiment, the door apparatus 100, 100' facilitates door 102, 102' movement between closed and open states without having to extend into the fuselage beyond the existing frame profiles and without having to pivot or extend outside the fuselage. Moreover, embodiments of the present disclosure can unlatch and move the door by an initial actuation movement along one path such as along the axis 118 in the illustrated embodiment.

Figure 11:
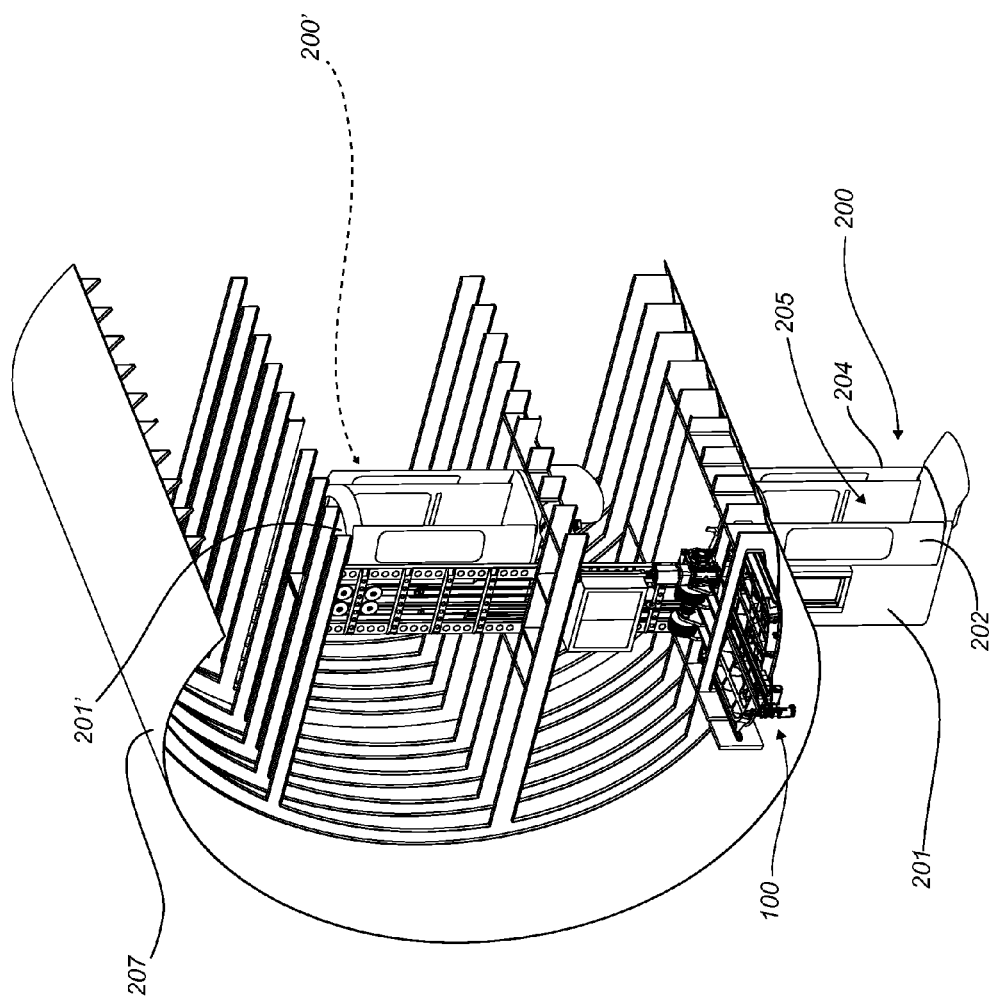
FIG. 11 is an isometric view of a passenger elevator system with an elevator carriage having a door apparatus according to one embodiment and installed in a portion of an aircraft fuselage having a door apparatus according to one embodiment installed therein.

As illustrated in FIG. 11 with respect to one embodiment, the door apparatus 100 according to one aspect can be used to occlude an opening existing or introduced in an aircraft fuselage 207 to facilitate ingress/egress of a passenger elevator. One such passenger elevator is disclosed in United States Patent Application Publication Number US2011/0084172 A1, dated Apr. 14, 2011. Embodiments of the present disclosure can be used with respect to other passenger elevator systems.

The scope of the present disclosure with respect to fuselage door apparatuses is not limited to the foregoing description of certain embodiments and aspects. Other embodiments and aspects may include additional or fewer components while falling within the scope of the present disclosure.

In an alternative embodiment for example, the drive yoke may contribute to lifting the door via components formed or coupled between the drive yoke and door, such as the cam member and cam follower.

For example, in one aspect, the drive yoke can have a substantially fixed length and is substantially rigid, and as the drive carriage translates forward, the drive yoke rotates to a threshold rotational position and lifts the door toward the open state. In such an embodiment, the drive yoke at least partially contributes to supporting the door in a cantilevered state.

Some embodiments may include a plurality of drive carriage or yoke elements. In some embodiments as in the illustrated embodiment, the drive yoke may include a triangular or fork design, diverging toward its end coupled to the door and converging toward its end coupled to the drive carriage. Furthermore, the drive yoke in some embodiments may be coupled to the drive mechanism or a portion thereof, such as the ball nut, eliminating a separate drive carriage.

Yet other embodiments may preclude the primary tie rod and have the drive yoke more directly communicating with the secondary tie rods. In still other embodiments, the secondary tie rod may be precluded with the primary tie rods operatively coupled to the latch elements.

Although the illustrated embodiments are directed to movement of the door in the forward direction, it is contemplated that the door may be actuated to move in any direction, including laterally or inboard/outboard with respect to a fuselage or aft. In such embodiments, the door can move laterally with respect to the fuselage along a curved or linear path angled with respect to the fuselage longitudinal axis. In such embodiments, the drive carriage or drive yoke can move along a curved or linear path angled with respect to the fuselage longitudinal axis.

It is also contemplated that some embodiments may include electronic circuitry and control modules to selectively and automatically actuate the movement mechanism or a portion thereof, such as the ball screw mechanism 120 and/or drive apparatus 114. Such circuitry can be electronically coupled to a control panel in the cockpit of an aircraft, at attendant stations, in an elevator carriage such as that described below, or any other suitable location. Some embodiments may include manual drive assemblies in addition to, or instead of, an automatic drive system. For example provisions can be provided, such as a crank and/or lever in communication with the ball screw, to manually impart motion to the drive carriage.

FIGS. 11-15 illustrate a door apparatus 200 according to another embodiment. Without intention to limit the scope of the present disclosure, this embodiment and variations thereof may be suitable for access to an enclosure, such as a closet, cabin, room, lift or elevator carriage, and/or other suitable enclosures. For clarity and without intention to limit the scope of the present disclosure, the door apparatus 200 is discussed with respect to ingress/egress to and from an aircraft passenger lift carriage 201 operable to travel between multiple decks of an aircraft's fuselage 207, and/or extend to the ground outside the fuselage 207, as illustrated in FIG. 11. The lift carriage 201 is referred to as carriage 201 for clarity and brevity.

For clarity and without intention to limit the scope of the present disclosure, the phrase "inner end" is used with respect to each door 202, 204 to refer to respective proximal door ends configured to extend between upper and lower ends of the carriage 201, and the phrase "outer end" is used with respect to each door 202, 204 to refer to respective distal door ends configured to extend between upper and lower ends of the carriage 201.

Figure 12:
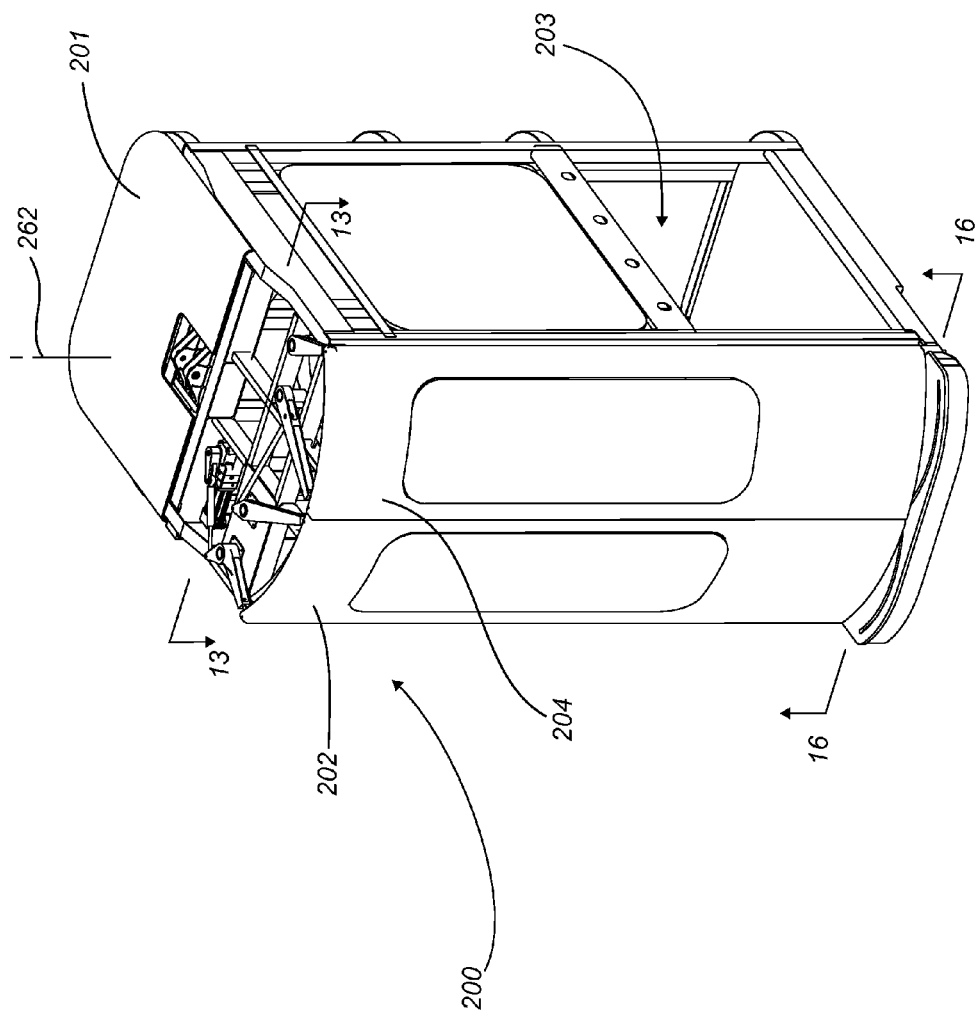
FIG. 12 is an isometric view of an elevator carriage having a door apparatus according to one embodiment.

In one embodiment illustrated in FIG. 12 the door apparatus 200 is configured to be operatively coupled to the carriage 201. In one embodiment, the door apparatus 200 includes a first door 202 and a second door 204. The first and second doors 202, 204 are configured to move between a closed position illustrated in FIG. 12 and an open position illustrated in FIGS. 11 and 15. In the closed position the doors 202, 204 are configured to occlude, close or obstruct an interior 203 (FIG. 12) of the carriage 201, and in the open position, they are configured to allow access to, or ingress/egress to and from, the interior 203. In FIGS. 12 through 16 portions of the carriage 201 such as some side and ceiling walls are removed for clarity.

In the illustrated embodiment, the first and second doors 202, 204, are each configured to occlude or enclose a portion of an opening 205 (FIG. 11) of the carriage 201, for example, half of the opening 205. Although some embodiments may include two independently actuated doors, in the illustrated embodiment, the first door 202 is a master or primary door and the second door 204 is a slave or auxiliary door. Such embodiments reduce actuation mechanisms and weight, and improve motion synchronicity between the first and second doors 202, 204.

The following describes one embodiment in more detail. For clarity, the first and second doors 202, 204, will hereinafter be referred to as master and slave doors 202, 204, respectively.

Figure 13:
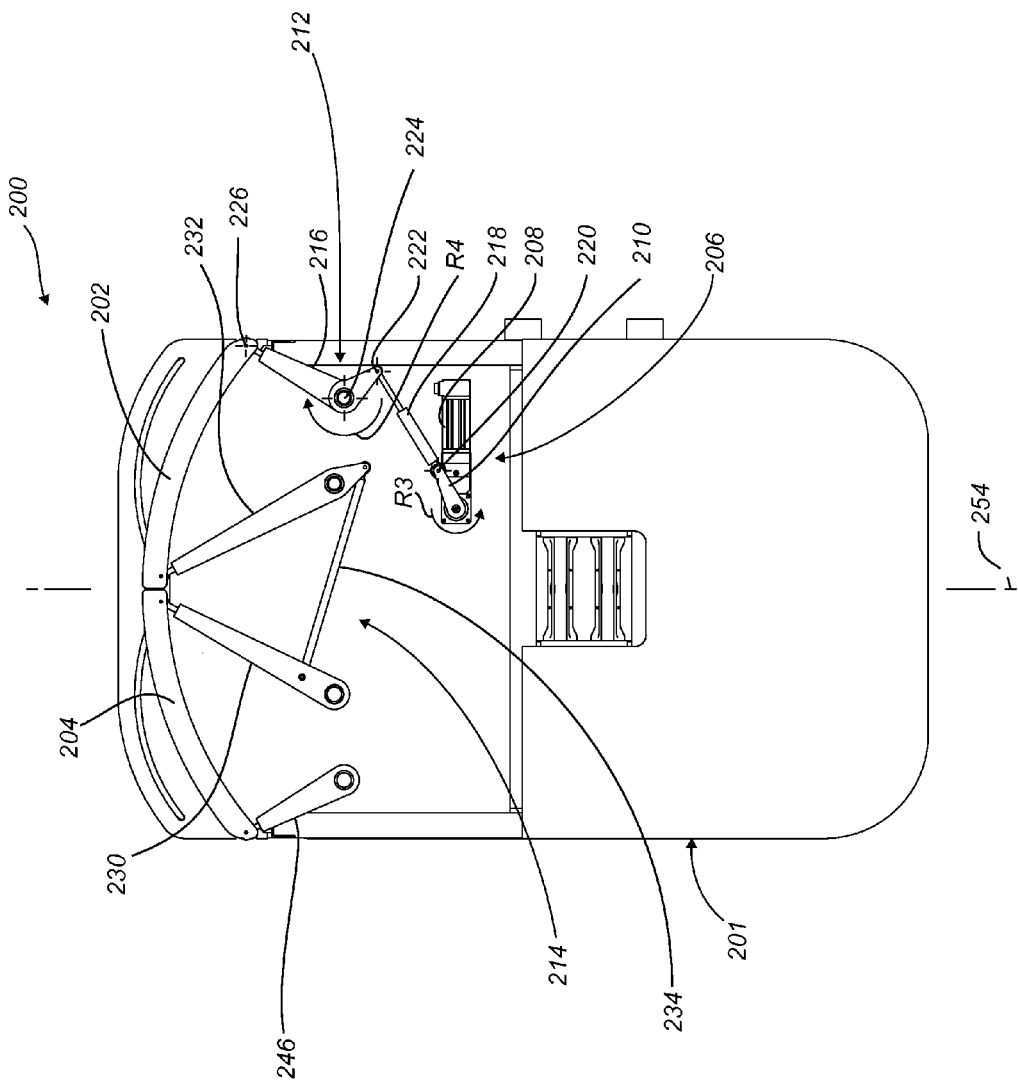
FIG. 13 is a top view of the elevator carriage and door apparatus of FIG. 12 with doors thereof in a closed position according to one embodiment.

As illustrated in FIG. 13, in one aspect the master door 202 is operatively coupled to a main actuator 206 configured to move the master door 202. For example, in one embodiment, the main actuator 206 includes a drive member 208, such as a motor and/or a transmission, and an actuating arm 210. For clarity and brevity without intention to limit the scope of the present disclosure, the drive member 208 is referred to as motor 208.

In one embodiment, the actuating arm 210 is pivotably mounted with respect to the motor 208, and operatively coupled to the master door 202 via a first linkage assembly 212. In one embodiment, the master door 202 is coupled to the slave door 204 via a second linkage assembly 214.

In one embodiment, the first linkage assembly 212 can include a master door actuator 216 and a first or master link element 218. In one aspect, the first link element 218 is pivotably coupled to the actuating arm 210 to pivot about a first floating axis 220, and pivotably coupled to the master door actuator 216 to pivot about a second floating axis 222, respectively. In one aspect, the first and second floating axes 220, 222 can be positioned toward opposing ends of the first link element 218. In other embodiments, the actuating arm 210 can move in any other suitable relation with respect to the motor 208 or motor housing, such as translate with respect thereto.

In one aspect, the master door actuator 216 is pivotably or rotatably mounted with respect to the carriage 201, for example toward an upper end of the carriage 201, to pivot or rotate about a first fixed axis 224, spaced from the second floating axis 222. The master door actuator 216 can also be pivotably coupled to the master door 202 to pivot about a third floating axis 226. In one embodiment, the master door actuator 216 includes a bell crank structure, which in one aspect can include an angled bell crank structure or in an alternative aspect include a 180 degrees bell crank structure.

In one aspect, as the actuating arm 210 pivots in a first radial direction R3, the master door actuator 216 rotates in a second radial direction R4, biasing the master door 202 from the closed position toward the open position.

The master door actuator 216 can be configured and positioned to facilitate a reduced profile motion envelope in proximity to the carriage 201 and opening 205 (FIG. 11). A reduced motion envelope is advantageous particularly in aircraft applications where aircraft structural elements, including fuselage skin and floor structure, are cut to facilitate carriage ingress/egress. A reduced motion envelope reduces the amount of structure requiring modification and reinforcement for accommodating the carriage 201. Further, a reduced motion envelope does not require excess space inside aircraft for accommodating loading and unloading.

Figure 14:
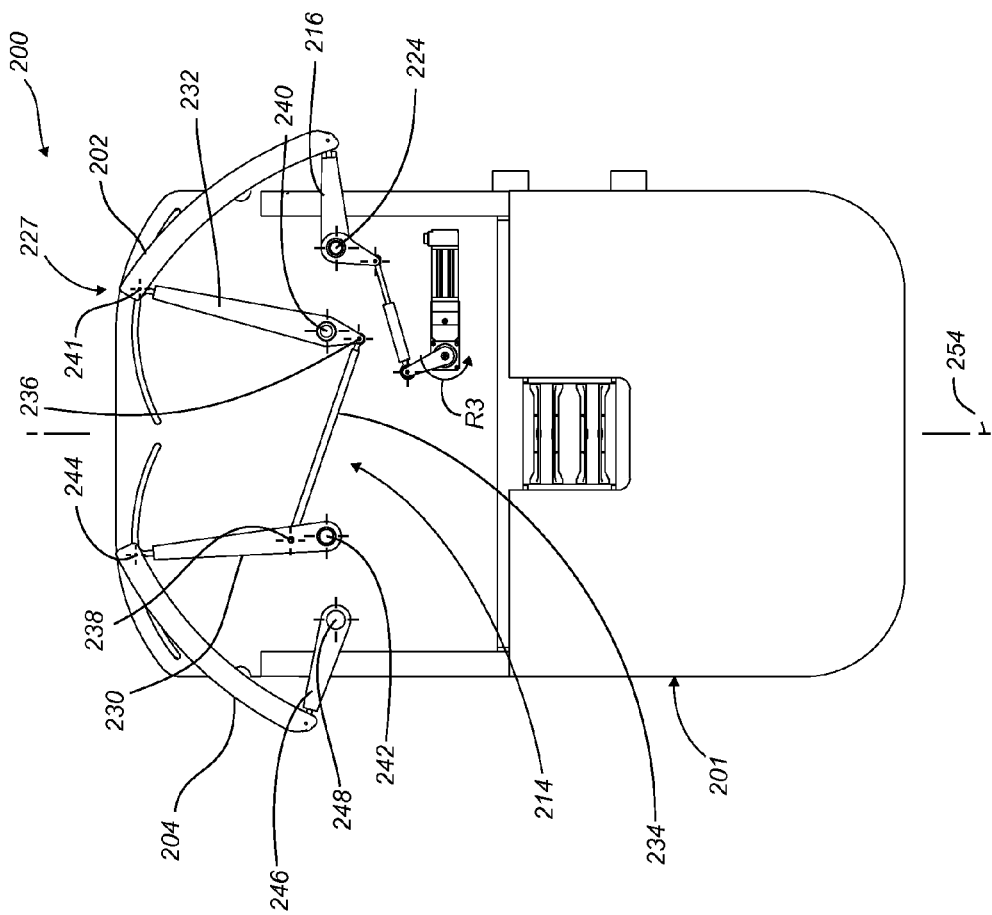
FIG. 14 is a top view of the elevator carriage and door apparatus of FIG. 12 with the doors in an intermediate position according to one embodiment.

As stated earlier, in one embodiment, the master door 202 can be coupled to the slave door 204 via a second linkage assembly 214. As illustrated in FIG. 14, the second linkage assembly 214 can be configured to move the slave door 204 in response to the master door 202 motion. In some embodiments, the master and slave doors 202, 204 can move in opposite or mirroring directions in a substantially synchronized relation. In other embodiments, a door apparatus may include two doors independently operated as discussed above with respect to the master door 202, and in opposite directions.

In the illustrated embodiment, the second linkage assembly 214 can include a slave door actuator 230 operatively coupled to an auxiliary actuator 232. In one aspect, the second linkage assembly 214 can include a slave or second link element 234 pivotably coupled toward a first end thereof to the auxiliary actuator 232, and pivotably coupled toward a second end thereof to the slave door actuator 230. In one embodiment, the auxiliary actuator 232 includes a bell crank structure, which in one aspect can be a 180 degrees bell crank structure or in an alternative aspect can be an angled bell crank structure.

As the master door 202 moves from the closed position to the open position, the second link element 234 pivots with respect to the auxiliary actuator 232 about a fourth floating axis 236 and with respect to the slave door actuator 230 about a fifth floating axis 238.

In one embodiment, the auxiliary actuator 232 is configured to be rotatably or pivotably coupled or mounted to the carriage 201, for example toward an upper end thereof, to rotate or pivot about a second fixed axis 240. In one embodiment, the slave door actuator 230 is configured to be rotatably or pivotably coupled or mounted to the carriage 201, for example toward an upper end thereof, to rotate or pivot about a third fixed axis 242. In the illustrated embodiment, the auxiliary actuator 232 is also pivotably coupled to the master door 202 to pivot about a sixth floating axis 241.

In the illustrated embodiment, the master door 202 rotates the auxiliary actuator 232 as the master door 202 moves. In the illustrated embodiment, the auxiliary actuator 232 is operable to guide and/or stabilize the master door 202, for example toward an inner end 227 of the master door 202, as the master door actuator 216 moves the master door 202.

In one embodiment, the auxiliary actuator 232 actuates the secondary linkage assembly 214 to rotate slave door actuator 230 and the slave door 204 via the second link 234. In other embodiments, the slave door actuator 230 can include a dual leg bell crank shape, one leg replacing the link member 234 and directly and pivotably coupled to the auxiliary actuator 232, eliminating the need for a separate second link member. In yet other embodiments, the auxiliary actuator 232 can include a bell crank leg replacing the link member 234 and directly and pivotably coupled to the slave door actuator 230.

In one embodiment, the second fixed axis 240 about which the auxiliary actuator 232 can rotate is positioned between the fourth and sixth floating axes 236, 241, about which the auxiliary actuator 232 is respectively pivotably coupled to the second link element 234 and first door 202. In the illustrated embodiment, as the master door 202 moves from the closed position to the open position, the auxiliary actuator 232 exerts a force on the second link element 234, rotating the slave door actuator 230 about the third fixed axis 242.

In one embodiment, the slave door actuator 230 can be pivotably coupled to the slave door 204 about a seventh floating axis 244. In one aspect, the fifth floating axis 238 about which the second link element 234 is pivotably coupled to the slave door actuator 230, is positioned between the third fixed axis 242 and the seventh floating axis 244. In one aspect, as the second link element 234 exerts a force on the slave door actuator 230, the latter rotates to move the slave door 204 in a motion similar to, and mirroring, the motion of the master door 202.

In one aspect, the door apparatus 200 includes a slave door guide element 246 that cooperates with the slave door actuator 230 to stabilize or manage the motion of the slave door 204. For example, the slave door actuator 230 and the slave door guide element 246 can be pivotably coupled toward opposing ends of the slave door 204. Moreover, the slave door guide element 246 can be configured to be rotatably or pivotably mounted to the carriage 201, for example toward and upper end thereof, to rotate about a fourth fixed axis 248.

In some aspects the respective lengths of the slave door actuator 230 and guide element 246, are each substantially constant. In other embodiments, their lengths can be variable within a range to provide some flexibility, for example to account for different material expansion and contraction properties between the slave door actuator 230, guide element 246 and the slave door 204. The same notion may apply to the master door actuator 216 and auxiliary actuator 232. In some embodiments these components' respective lengths can be selectively variable to suit varying carriage and/or carriage ingress/egress opening sizes.

The length of the second link element 234 and the position of the first and second fixed axes 240, 242 can be designed to facilitate a substantially synchronized opening and closing motion between the master and slave doors 202, 204.

Figure 15:
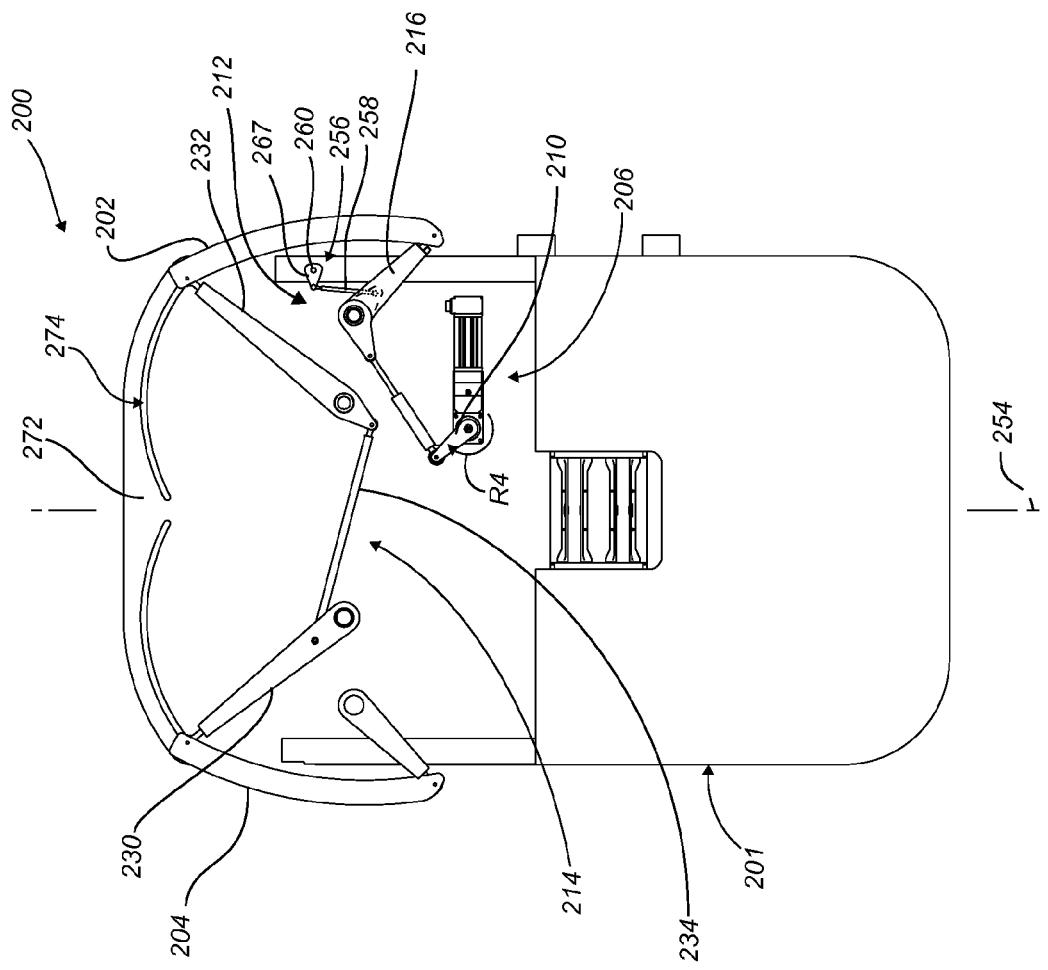
FIG. 15 is a top view of the elevator carriage and door apparatus of FIG. 12 with the doors in an open position according to one embodiment.

FIG. 15 illustrates one embodiment of the door apparatus 200 in the open state based on the above-described cooperation between the main actuator 206, actuating arm 210, and the first and second linkage assemblies 212, 214.

In one embodiment, the reverse of the above-described movements shifts the doors 202, 204 toward the closed state. For example, when the actuating arm 210 is rotated in the second radial direction R4, it rotates the master door actuator 216, bringing the master door 202 toward the closed position. As the master door 202 rotates, it rotates the auxiliary actuator 232 and the second link element 234, which in turn pulls on the slave door actuator 230, closing the slave door 204, to bring the door toward the closed state illustrated in FIG. 13.

In addition to making possible single drive actuation of both doors, the second linkage assembly 214 also aids maintaining the doors 202, 204 stable as they move between the open and closed states. In one aspect, the second linkage assembly 214 improves synchronization of the doors 202, 204, to achieve a smooth motion of the doors at a consistent speed or at consistently decelerating or accelerating speeds toward the end and/or beginning of the door movements.

Referring to FIG. 14, in some embodiments the first and second fixed axes 224, 240 associated with the master door 202, and the third and fourth fixed axes 242, 248 associated with the slave door 204, can be positioned on symmetrically opposite sides of a central axis 254 of the carriage 201. In some embodiments, the master door actuator 216 and the slave door guide element 246 can be symmetrically positioned on opposing sides of the central axis 254 and have similar or substantially the same length between the corresponding fixed axis and door coupling location thereof. In some embodiments, the auxiliary actuator 232 and the slave door actuator 230 can be symmetrically positioned on opposing sides of the central axis 254 and have similar or substantially the same length between the corresponding fixed axis and door coupling location thereof.

The above description of embodiments of a carriage door apparatus is intended to provide a thorough understanding of the present disclosure with respect to some embodiments; however, the present disclosure of the carriage door apparatus is not limited to the described embodiments. Other linkage arrangements utilizing a primary actuated door linked to an auxiliary door actuated by movement of the primary door are contemplated to be within the scope of the present disclosure. Furthermore, other features may be incorporated to further stabilize the door movements and improve operations and appearance of the carriage door movements.

For example, in some embodiments as in the illustrated embodiment of FIG. 15, the door apparatus 200 may include at least one stabilizing mechanism 256 or one stabilizing mechanism 256 for each of the master and slave doors 202, 204. The description below is with respect to one embodiment of the master door 202 stabilizing mechanism 256, and it is contemplated that a similar mechanism can be incorporated for the slave door 204.

In the illustrated embodiment, the stabilizing mechanism 256 includes an upper coupling link 258 and a synchronization tube 260. In one aspect, the upper coupling link 258 can be pivotably coupled to the corresponding synchronization tubes 260 and master door actuator 216. In one aspect, movement of the master door 202 rotates the synchronization tube 260, which in turn stabilizes and synchronizes motion of respective lower end of the master door 202, 204 with respect to the upper end thereof.

Figure 16:
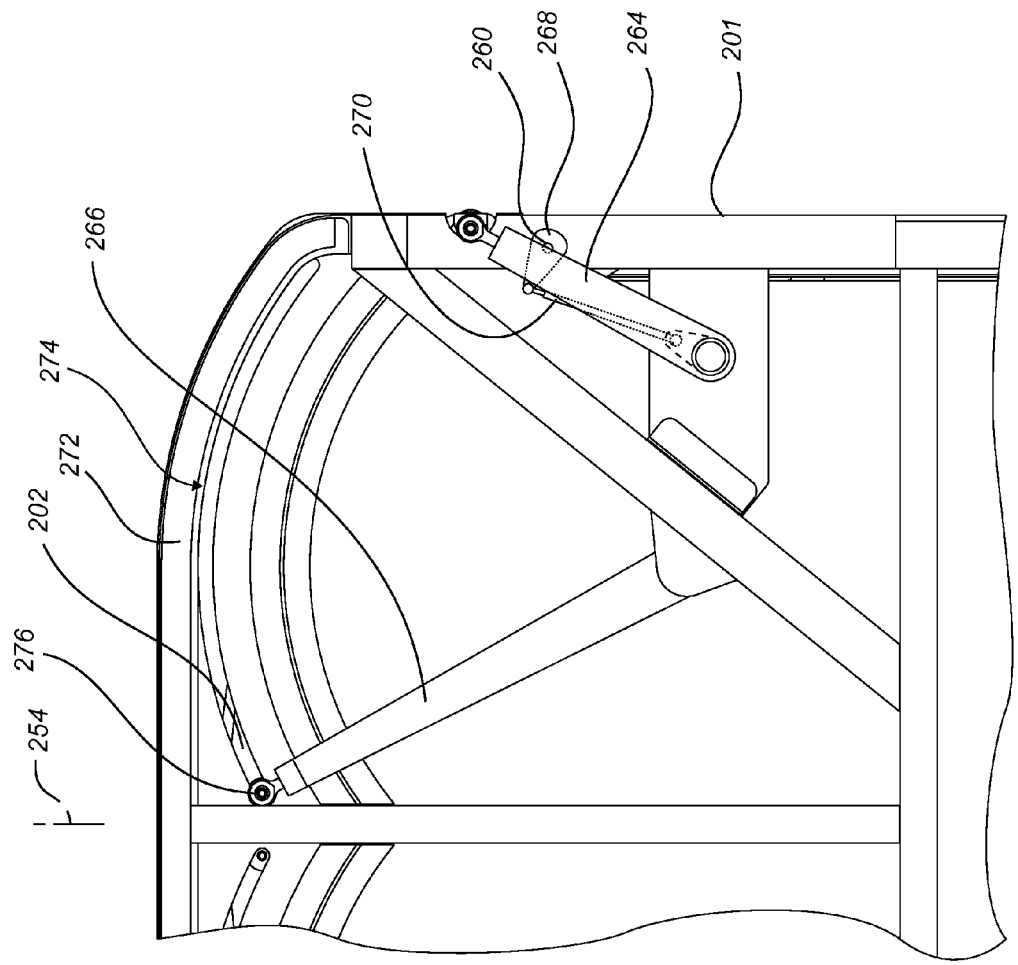
FIG. 16 is a partial bottom view of the elevator carriage and door apparatus of FIG. 12 with the doors in a closed position according to one embodiment.

In one embodiment, the synchronization tube 260 may extend parallel to a longitudinal axis 262 (FIG. 12) of the carriage 201 toward a lower or bottom region of the carriage 201. In one aspect as illustrated in FIG. 16, the apparatus 200 includes first lower guide 264 generally similar or substantially identical to the master door actuator 216.

In one embodiment, the first lower guide 264 can be respectively coupled toward the lower end of the corresponding synchronization tube 260 via a lower coupling link 270 similar to the upper coupling link 258 illustrated in FIG. 15. In one embodiment the synchronization tube 260 includes or is coupled to upper and lower fittings 267, 268 pivotably coupled to respective upper and lower portions of the carriage 201, such as toward upper and lower ends of a sidewall thereof.

In one embodiment, the first lower guide 264 can be pivotably coupled toward opposing ends thereof to a lower region of the carriage 201 and toward an outer lower end of the master door 202, respectively. In an embodiment illustrated in FIGS. 14 and 15, as the master door actuator 216 pivots with respect to the carriage 201, the upper fitting 267 rotates, in turn rotating the synchronization tube 260. In one aspect illustrated in FIG. 16, rotation of the synchronization tube 260 pivots the lower fittings 268, the motion transferring to the first lower guide 264 via the lower coupling link 270, to move the lower first lower guide 264 substantially synchronized with the master door actuator 216.

In addition to stabilizing the doors, such embodiments also improve smooth operation, stability, and appearance of the door opening and closing motions. For clarity and brevity, the foregoing stabilization mechanism is described with respect to the master door 202 and master door actuator 216. It is contemplated that in some embodiments a similar and mirroring stabilizing mechanism can be incorporated with respect to the slave door 204 and slave door guide 246.

In one embodiment, the door apparatus 200 can include additional stabilization features. For example, as illustrated in FIG. 16, the door apparatus 200 may include a second lower guide 266, generally similar or substantially identical to the auxiliary actuator 232 (FIG. 13). In one embodiment, the stabilizing links 266 can be rotatably coupled toward a lower end, for example toward a lower inner end, of the master door 202. The second lower guide 266 and the auxiliary actuator 232 can in some embodiments be coupled via a tube or elongated member extending longitudinally substantially parallel to the longitudinal axis 262 (FIG. 12) of the carriage 201.

For clarity and brevity, the foregoing second lower guide is described with respect to the master door 202 and auxiliary actuator 232. It is contemplated that in some embodiments a similar and mirroring mechanism can be incorporated with respect to the slave door 204 and slave door actuator 230.

In some embodiments as shown in FIGS. 15 and 16, the door apparatus 200 or carriage 201 can include a platform element 272 having a first slidable coupling feature 274, such as a recess, slot, groove, and/or any other suitable coupling feature. In one embodiment, the master door 202 can include a second slidable coupling feature 276 (FIG. 16) such as a protrusion, lip, extension, or any other suitable coupling feature configured to be slidably coupled to the first slidable coupling feature 274. In one aspect, the second slidable coupling feature 276 is positioned toward the inner end of the master door 202. In one aspect, the platform 272 is positioned toward the lower end of the carriage 201 and the firs slidable coupling feature 274 is shaped to facilitate the master door 202 follow the motion imparted thereto by the master door actuator 216. In one aspect, the first slidable coupling feature 274 can be a through slot as shown in FIG. 16, the second slidable coupling feature 274 extending therethrough and rotatably coupling to the second lower guide 266.

For brevity, the foregoing slidable coupling features are described with respect to the master door 202 and it is contemplated that a similar and opposing arrangement can be incorporated with respect to the slave door 204.

Some embodiments may include control devices and/or electronic circuitry electrically coupled to the door apparatus 200 and/or drive member or motor 206 to facilitate operating the door apparatus 200 selectively and automatically. For example a control device in electronic communication with the main actuator 206 can be located in the carriage 201 and configured to control operation of door apparatus 200 based on user input relating to destination of the carriage 201 at fuselage 207 decks or ground. A control panel can also be located in a cockpit of an aircraft, a flight attendant station, or any other suitable or desired location. In addition, or instead, some embodiments may include features that facilitate manual operation of the door apparatus 200. For example, at least one of the components or linkages described above can include dampening and/or resistance features that help maintain the doors in the open and/or closed states. These or other features can also be incorporated to help bias the door toward the open and/or closed positions.

For example, in one embodiment illustrated in FIG. 13, the first link element 218 can include a plunger and cylinder combination with hydraulic and/or pneumatic dampening features. In some embodiments the first link element 218 can include a fluid or gas spring mechanism, biasing the doors toward the open and/or closed positions when they are manually forced apart and/or toward each other. Such a mechanism also helps maintain the doors in the open and closed positions.

As the foregoing demonstrates, a carriage door apparatus according to embodiments of the present disclosure substantially reduces the number and complexity of the door operation mechanism, components, overall weight of the system, and door motion envelope, while improving the look, feel, synchronous movement, and functionality of the doors. A carriage door apparatus according to embodiments of the present disclosure also facilitates automatic and manual operations, and obviates the necessity for multiple drive members, further reducing weight and complexity, which in turn also reduces the cost of the apparatus and the maintenance thereof.

Embodiments of this disclosure facilitate compact and efficient installation of an elevator carriage and ingress/egress structure thereof in aircraft.

The described embodiments can also be combined in various ways. For example, as illustrated in FIG. 11, the elevator carriage 201 having carriage door apparatus 200 can be configured to extend below the fuselage through an opening in the fuselage, which in turn can be sealed during flight by the fuselage door apparatus 100 described further above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A door apparatus comprising:
a door adapted to move from a closed state to an open state in an open cycle, and from the open state to the closed state in a close cycle, the door configured to occlude an opening in the closed state and reveal the opening in the open state;
an actuating mechanism pivotably coupled to the door, the actuating mechanism including a drive carriage and a drive yoke;
at least one latch adapted to be moved between a deployed state and a retracted state; and
a tie rod mechanism coupled to the latch, and operatively coupled to the actuating mechanism, movement of the drive carriage and the drive yoke in the open cycle moving the tie rod mechanism and shifting the latch to the retracted state, wherein the drive yoke includes a first portion rotatably coupled to the drive carriage and a second portion rotatably coupled to the tie rod mechanism, the first and second portions of the drive yoke being pivotably coupled to one another.

2. The door apparatus of claim 1, further comprising:
a ball nut coupled to the actuating mechanism; and
a ball shaft, the ball nut threadedly coupled to the ball shaft and configured to move substantially linearly with respect to the ball shaft to impart motion to the actuating mechanism.

3. The door apparatus of claim 1 wherein,
the actuating mechanism includes the drive yoke, and
the tie rod mechanism includes:
a primary tie rod pivotably coupled with respect to the drive yoke, and
a secondary tie rod coupled to the latch; and
a bell crank mechanism coupling the primary tie rod to the secondary tie rod, pivoting of the drive yoke in the open cycle moving the primary tie rod, the bell crank mechanism transmitting the primary tie rod motion to move the secondary tie rod and shift the latch to the retracted state.

4. A door apparatus comprising:
a door adapted to move from a closed state to an open state in an open cycle, and from the open state to the closed state in a close cycle, the door configured to occlude an opening in the closed state and reveal the opening in the open state;
an actuating mechanism pivotably coupled to the door, the actuating mechanism including a drive carriage and a drive yoke;
at least one latch adapted to be moved between a deployed state and a retracted state; and
a tie rod mechanism coupled to the latch, and operatively coupled to the actuating mechanism, movement of the drive carriage and the drive yoke in the open cycle moving the tie rod mechanism and shifting the latch to the retracted state, wherein the actuating mechanism further includes:

a cam member coupled to the drive yoke, the drive yoke being pivotably coupled to the tie rod mechanism,
a first bell crank lever including a cam follower configured to shift in response to a movement of the cam member, and
a second bell crank lever rotatably coupled to the primary tie rod, the first bell crank lever coupled to the second bell crank lever to rotate with respect thereto in a first radial direction and to rotate therewith in a second radial direction.

5. A door apparatus comprising:
a door adapted to move from a closed state to an open state in an open cycle, and from the open state to the closed state in a close cycle, the door configured to occlude an opening in the closed state and reveal the opening in the open state;
an actuating mechanism pivotably coupled to the door, the actuating mechanism including a drive carriage and a drive yoke;
at least one latch adapted to be moved between a deployed state and a retracted state;
a tie rod mechanism coupled to the latch, and operatively coupled to the actuating mechanism, movement of the drive carriage and the drive yoke in the open cycle moving the tie rod mechanism and shifting the latch to the retracted state; and
a lost motion mechanism including:
a cam member coupled to the drive yoke,
a cam follower rotatably coupled to the tie rod mechanism, the cam member configured to rotate in a first radial direction in response to movement of the drive yoke, and bias the cam follower in a second radial direction, movement of the cam follower actuating the tie rod mechanism.

6. The door apparatus of claim 5 wherein the lost motion mechanism further includes:
a one-way coupling coupled to at least one of the cam member and cam follower, the one-way coupling configured to allow the cam follower to transfer motion from the cam member to a primary tie rod of the tie rod mechanism during the open cycle and to prevent motion from the cam member from being transferred to the primary tie rod during the close cycle.

7. The door apparatus of claim 6 wherein the one-way coupling includes:
a first bell crank member coupled to the cam follower and including a first coupling feature,
a second bell crank member rotatably coupled to the tie rod mechanism and including a second coupling feature, and
a biasing element coupled to the first and second bell crank members, the biasing element configured to urge the first coupling feature against the second coupling feature in the second radial direction, and allow rotation of the first bell crank member with respect to the second bell crank member in the first radial direction.

* * * * *